US 11,747,601 B2

(12) United States Patent
Okubo

(10) Patent No.: US 11,747,601 B2
(45) Date of Patent: Sep. 5, 2023

(54) TELESCOPE AND TELESCOPE SERIES

(71) Applicant: Asia Optical Co., Inc., Taichung (TW)

(72) Inventor: Shogo Okubo, Taichung (TW)

(73) Assignee: ASIA OPTICAL CO., INC., Taichung (TW)

(*) Notice: Subject to any disclaimer, the term of this patent is extended or adjusted under 35 U.S.C. 154(b) by 390 days.

(21) Appl. No.: 17/250,916

(22) PCT Filed: Jul. 11, 2019

(86) PCT No.: PCT/JP2019/027445
§ 371 (c)(1),
(2) Date: Mar. 26, 2021

(87) PCT Pub. No.: WO2020/066224
PCT Pub. Date: Apr. 2, 2020

(65) Prior Publication Data
US 2021/0333522 A1 Oct. 28, 2021

(30) Foreign Application Priority Data
Sep. 28, 2018 (JP) .................. 2018185331

(51) Int. Cl.
G02B 13/00 (2006.01)
G02B 9/60 (2006.01)
(Continued)

(52) U.S. Cl.
CPC .......... G02B 13/0095 (2013.01); G02B 9/60 (2013.01); G02B 15/04 (2013.01); G02B 23/00 (2013.01); G02B 25/001 (2013.01)

(58) Field of Classification Search
CPC ........ G02B 15/04; G02B 15/12; G02B 15/14; G02B 15/24; G02B 15/145123;
(Continued)

(56) References Cited

U.S. PATENT DOCUMENTS

2004/0145818 A1   7/2004 Ishii
2007/0159685 A1*  7/2007 Wagner ............... G02B 23/00
                                                         359/365
(Continued)

FOREIGN PATENT DOCUMENTS

CA      2870695 A1     6/2013
DE   102004003139 A    7/2004
(Continued)

OTHER PUBLICATIONS

International Search Report and Written Opinion dated Aug. 20, 2019, issued in application No. PCT/JP2019/027445 with English Translation.

Primary Examiner — George G. King
Assistant Examiner — Anna Elizabeth Smith
(74) Attorney, Agent, or Firm — McClure, Qualey & Rodack, LLP

(57) ABSTRACT

A relay optical system (RL) of this telescope has arranged therein, in the following order from the object side: a first lens group (G1) having positive refractive power; a second lens group (G2) having positive refractive power; a third lens group (G3) having positive refractive power; a fourth lens group (G4) having negative refractive power; and a fifth lens group (G5) having positive refractive power, wherein the magnification of the telescope can be changed by causing an image formed on a first image plane (IM1) to be re-formed on a second image plane (IM2) and further causing the second lens group (G2) and the third lens group (G3) to move along the optical axis, and thereby varying the image-forming magnification of the relay optical system (RL).

19 Claims, 15 Drawing Sheets

(51) Int. Cl.
*G02B 15/04* (2006.01)
*G02B 23/00* (2006.01)
*G02B 25/00* (2006.01)

(58) Field of Classification Search
CPC ........ G02B 9/60; G02B 9/64; G02B 13/0095; G02B 23/00; G02B 25/001
See application file for complete search history.

(56) References Cited

U.S. PATENT DOCUMENTS

| | | |
|---|---|---|
| 2014/0092470 A1 | 4/2014 | Szapiel |
| 2016/0356996 A1 | 12/2016 | Miyazaki |
| 2017/0336594 A1 | 11/2017 | Takada |

FOREIGN PATENT DOCUMENTS

| | | |
|---|---|---|
| EP | 2901197 A1 | 8/2015 |
| EP | 3109684 A1 | 12/2016 |
| JP | 10319322 A | 12/1998 |
| JP | 2004226544 A | 8/2004 |
| JP | 2007199336 A | 8/2007 |
| JP | 201778725 A | 4/2017 |
| WO | 2014051810 A1 | 4/2014 |
| WO | 2015125480 A1 | 8/2015 |
| WO | 2016129056 A1 | 8/2016 |

\* cited by examiner

TELESCOPE AND TELESCOPE SERIES

CROSS REFERENCE TO RELATED APPLICATIONS

This application is based on International Application Number PCT/JP2019/027445, filed Jul. 11, 2019, which is incorporated by reference in its entity.

BACKGROUND OF THE INVENTION

Field of the Invention

The invention relates to a telescope and telescope series.

Description of the Related Art

A known telescope includes an objective lens system, a relay lens system, and an eyepiece system (e.g., patent document 1), all of which are arranged in order from an object side. The relay lens system of the telescope is, for example, arranged in order from the object side, includes a first lens group having positive refractive power, a second lens group having positive refractive power, and a third lens group having positive refractive power, and the second lens group and the third lens group move along an optical axis to change the image magnification. Also for example, the relay lens system is arranged in order from the object side, includes a first lens group having positive refractive power, a second lens group having positive refractive power, a third lens group having positive refractive power, and a fourth lens group having negative refractive power, and the second lens group and the third lens group move along an optical axis to change the image magnification. However, in the above-mentioned relay lens system, when the image magnification becomes larger, it becomes difficult to correct aberration.

[Patent Document 1] Specification of U.S. Pat. No. 7,944,611

BRIEF SUMMARY OF THE INVENTION

A telescope of a first type includes an objective lens system, a relay lens system, and an eyepiece system, all of which are arranged in order from an object side. The relay lens system includes a first lens group having positive refractive power, a second lens group having positive refractive power, a third lens group having positive refractive power, a fourth lens group having negative refractive power, and a fifth lens group having positive refractive power, all of which are arranged in order from the object side, wherein an image formed by the objective lens system is reimaged on an image plane which is between the relay lens system and the eyepiece system. The second lens group and the third lens group move along an optical axis to change the image magnification of the relay lens system, so that the magnification of the telescope can be changed, and the telescope can maintain excellent image performance while the telescope changes the magnification greatly.

A telescope series of a second type includes a first telescope and a second telescope. The first telescope includes a first objective lens system, a first relay lens system, and a first eyepiece system, all of which are arranged in order from an object side. The second telescope includes a second objective lens system, a second relay lens system, and a second eyepiece system, all of which are arranged in order from an object side. The first relay lens system includes a first lens group having positive refractive power, a second lens group having positive refractive power, a third lens group having positive refractive power, a fourth lens group having negative refractive power, and a fifth lens group having positive refractive power, all of which are arranged in order from the object side, wherein an image formed by the first objective lens system is reimaged on an image plane which is between the first relay lens system and the first eyepiece system. The second lens group and the third lens group move along an optical axis to change the image magnification of the first relay lens system, so that the magnification of the first telescope can be changed. The second relay lens system is composed of the same lens group as the first relay lens system. An image formed by the second objective lens system is reimaged on an image plane which is between the second relay lens system and the second eyepiece system. A second lens group and a third lens group move along the optical axis to change the image magnification of the second relay lens system, so that the magnification of the second telescope can be changed.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

A detailed description of the invention is given with reference to the accompanying drawings. In a practice mode of the invention, a telescope that has a large zoom range of magnification and can well correct aberration will be described. The telescope of the practice mode of the invention has a zoom function, for example, is used for rifle sight and monocular.

Figure 1:
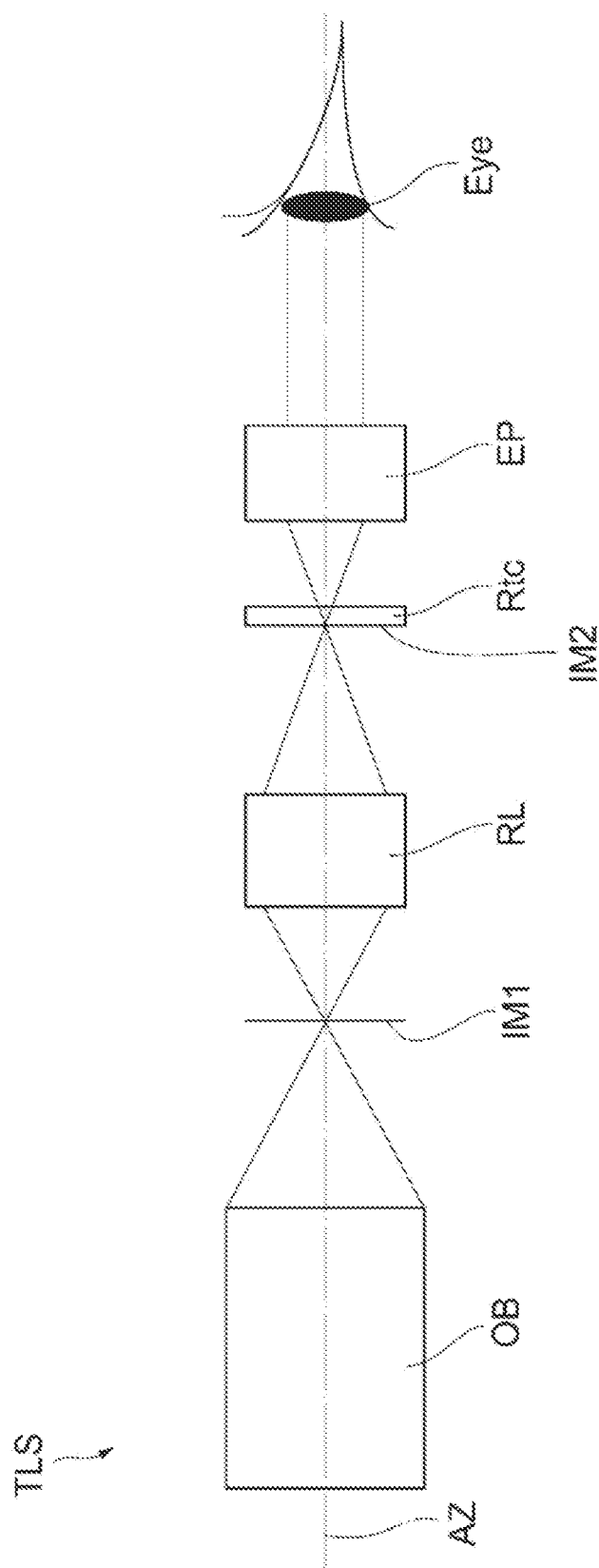
FIG. 1 is a schematic diagram of a telescope of a practice mode of the invention.

FIG. 1 is a schematic diagram of a telescope of a practice mode of the invention. The telescope TLS includes an objective lens system OB, a relay lens system RL, and an eyepiece system EP, all of which are arranged in order from an object side (observation object side). The objective lens system OB, the relay lens system RL, and the eyepiece system EP are composed of a single lens or multiple lenses respectively. The objective lens system OB collects light emitted from an object (observation object) and forms an inverted image of the object on the first image plane IM1. The relay lens system RL reimages the inverted image of the object formed by the objective lens system OB as an upright image on a second image plane IM2. A mask Rtc with fixed pattern (for example, a cross pattern) is disposed on the second image plane IM2. However, it is not limited to the second image plane IM2, the mask Rtc may be disposed on the first image plane IM1.

In the practice mode of the invention, the relay lens system RL reimages the inverted image of the object formed by the objective lens system OB toward the eyepiece system EP with different magnifications. That is, by changing the image magnification of the relay lens system RL, the magnification of the telescope can be changed. Thus, the observer can observe the upright image of the object with different magnifications through the eyepiece system EP.

Figure 2:
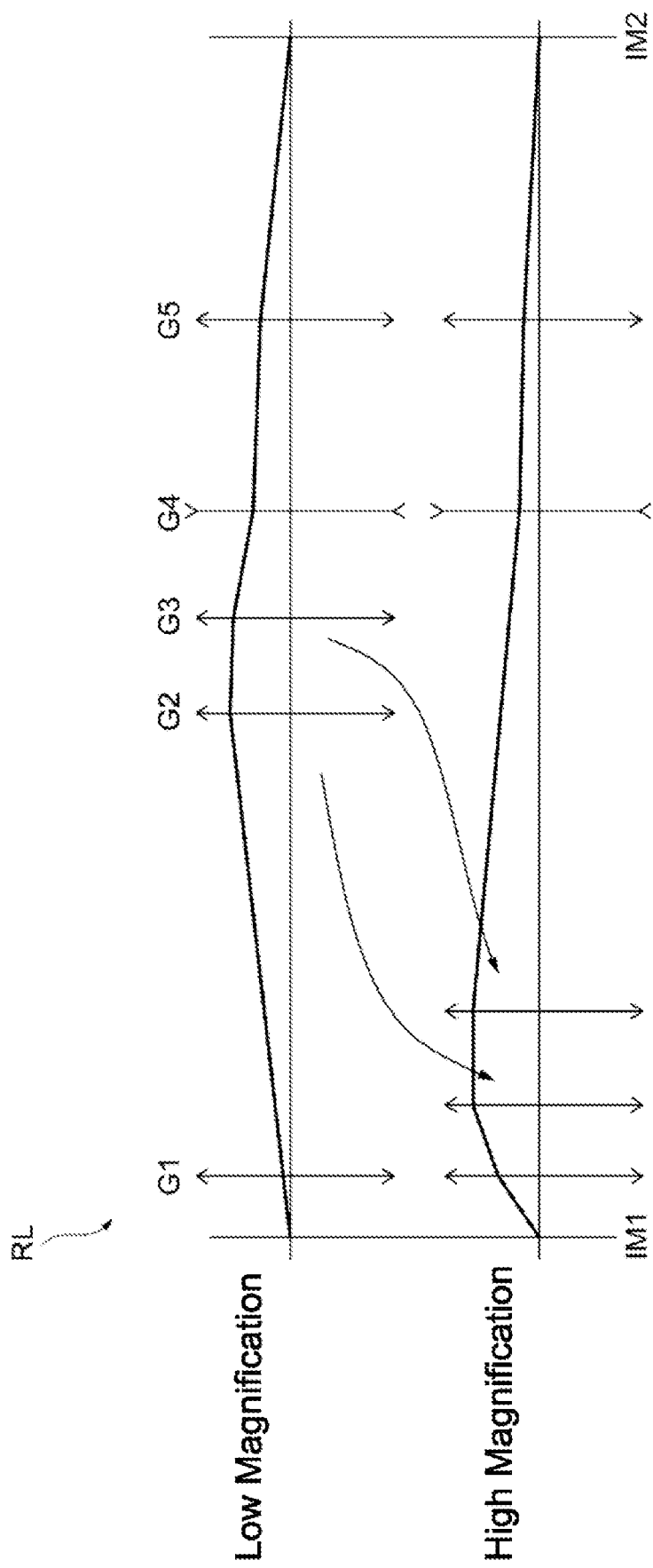
FIG. 2 is a schematic diagram of a relay lens system of a practice mode of the invention.

FIG. 2 is a schematic diagram of a relay lens system of the practice mode of the invention. The relay lens system RL includes a first lens group G1 having positive refractive power, a second lens group G2 having positive refractive power, a third lens group G3 having positive refractive power, a fourth lens group G4 having negative refractive power, and a fifth lens group G5 having positive refractive power, all of which are arranged in order from an object side (objective lens system OB side). The second lens group G2 and the third lens group G3 move along an optical axis while fixing the first image plane IM1 and the second image plane IM2, so that the image magnification of the relay lens system RL can be changed. Furthermore, when the image magnification of the relay lens system RL changes from low magnification to high magnification, the second lens group G2 and the third lens group G3 move to the object side along the optical axis AZ respectively. In addition, when the image magnification of the relay lens system RL changes, the first lens group G1, the fourth lens group G4, and the fifth lens group G5 are fixed on the optical axis AZ.

The first lens group G1 is with positive refractive power (パワー) having field lens function and is fixed on the optical axis AZ. The second lens group G2 and the third lens group G3 are with positive refractive power (パワー) and have variable magnification function. As described above, by moving the second lens group G2 and the third lens group G3 along the optical axis, the image magnification of the relay lens system RL can be changed. The fourth lens group G4 is a fixed lens group having negative refractive power (パワー). Since the fourth lens group G4 has negative refractive power, it can correct Petzval sum and can also correct various aberrations such as field curvature.

If the relay lens system composed of the first to fourth lens groups (consisting of 4 groups, positive, positive, positive, negative) is not used for making the total length longer, but trying to increase the magnification, the effective focal length of the relay lens system will become shorter. In this case, in order to correct aberration well, it is necessary to increase the negative refractive power of the fourth lens group. However, if the negative refractive power of the fourth lens group is too strong, the peripheral light will diverge too much, and it will be difficult for the relay lens system to maintain small outer diameter.

In the practice mode of the invention, the fifth lens group G5 with positive refractive power is disposed on the eyepiece system EP side of the fourth lens group G4. As a result, even if the negative refractive power of the fourth lens group G4 becomes stronger, the incident angle of the peripheral light corresponding to the second image plane IM2 may be smoothed through the fifth lens group G5 having positive refractive power. Therefore, the small outer diameter of the relay lens system RL can be maintained and various aberrations such as field curvature can be well corrected at the same time. In addition, even if the effective focal length of the relay lens system RL becomes longer, the total length of the relay lens system (the distance from the first image plane IM1 to the second image plane IM2) can be shortened through the fifth lens group G5 with positive refractive power. In this way, according to the practice mode of the invention, while keeping the total length of the relay lens system RL short, the aberration of the telescope TLS can be corrected well even if the magnification changes from 6 times to 12 times.

The telescope TLS of the practice mode of the invention can satisfy the following condition (1):

$$0.1 < (-f4)/f5 < 1.0 \tag{1};$$

wherein f4 is an effective focal length of the fourth lens group G4 and f5 is an effective focal length of the fifth lens group G5.

Condition (1) defines the ratio of the effective focal length of the fourth lens group G4 to the effective focal length of the fifth lens group G5. By satisfying the condition (1), the aberration of the relay lens system RL can be corrected well while maintaining the small outer diameter.

When the value of condition (1) exceeds the upper limit, the negative refractive power of the fourth lens group G4 becomes weak and Petzval sum and spherical aberration are difficult to be corrected. In addition, if the refractive power of the fifth lens group G5 is too strong, it is difficult to correct various aberrations. In order to ensure the effect of the practice mode of the invention, the optimal upper limit of the condition (1) may be 0.9.

When the value of condition (1) is lower than the lower limit, the negative refractive power of the fourth lens group G4 becomes too strong, resulting in excessive divergence of the peripheral light which makes it difficult to maintain the small outer diameter for relay lens system. In addition, since the refractive power of the fifth lens group G5 becomes too weak, it becomes difficult to smooth the incident angle of the peripheral light corresponding to the second image plane IM2 and hard to correct aberrations while maintaining the small outer diameter for the relay lens system RL. In order to ensure the effect of the practice mode of the invention, the optimal lower limit of the condition (1) may be 0.2.

The telescope TLS of the practice mode of the invention can satisfy the following condition (2):

$$0.5<\Phi 23/\Phi 5<1.0 \qquad (2);$$

wherein Φ5 is a maximum outer diameter of the fifth lens group G5 and Φ23 is a maximum outer diameter among the second lens group G2 and the third lens group G3.

Condition (2) defines the relationship between the maximum outer diameter of the fifth lens group G5 and the maximum outer diameter among the second lens group G2 and the third lens group G3. By satisfying condition (2), the aberration can be corrected well while maintaining the small outer diameter for the relay lens system RL. The maximum outer diameter of the fifth lens group G5 is the largest outer diameter of the lens among the lenses of the fifth lens group G5. The maximum outer diameter among the second lens group G2 and the third lens group G3 is the largest outer diameter of the lens among the second lens group G2 and the third lens group G3. The outer diameter of the lens is the diameter of the periphery of the lens.

When the value of condition (2) exceeds the upper limit, the maximum outer diameter among the second lens group G2 and the third lens group G3 becomes larger which makes it difficult to maintain the small outer diameter for relay lens system. In addition, in order to allow the light of the fourth lens group G4 with negative refractive power to diverge and the maximum outer diameter of the fifth lens group G5 is small, the fourth lens group G4 and the fifth lens group G5 must be close to each other. However, if the fourth lens group G4 and the fifth lens group G5 are too close, it is difficult to correct distortion. In order to ensure the effect of the practice mode of the invention, the optimal upper limit of the condition (2) may be 0.9.

When the value of the condition (2) is lower than the lower limit, the maximum outer diameter of the fifth lens group G5 becomes larger, making it difficult to maintain the small outer diameter for the relay lens system RL. In addition, in order to reduce the maximum outer diameter among the second lens group G2 and the third lens group G3, making the exit pupil diameter is reduced and the actual field of view of the telescope is also narrowed. In order to ensure the effect of the practice mode of the invention, the optimal lower limit of the condition (2) may be 0.6.

The telescope TLS of the practice mode of the invention can satisfy the following condition (3):

$$0.2<dG2/L<0.6 \qquad (3);$$

wherein dG2 is a maximum amount of movement of the second lens group G2 when the image magnification of the relay lens system RL changes from the lowest magnification to the highest magnification and L is a total length of the relay lens system RL.

Condition (3) defines the ratio of the maximum amount of movement of the second lens group G2 to the total length of the relay lens system RL when the image magnification of the relay lens system RL changes. By satisfying condition (3), various aberrations such as spherical aberration can be well corrected. The maximum amount of movement of the second lens group G2 is the maximum value of the position change of the second lens group G2 when the image magnification of the relay lens system RL changes from the lowest magnification to the highest magnification. The total length of the relay lens system RL is an interval from the first image plane IM1 to the second image plane IM2.

When the value of condition (3) exceeds the upper limit, the refractive power of the second lens group G2 or the third lens group G3, which is a variable magnification group, needs to be reduced and the overall power balance of the relay lens system RL will be destroyed, making it difficult to correct various aberrations such as spherical aberration. In order to ensure the effect of the practice mode of the invention, the optimal upper limit of the condition (3) may be 0.5.

When the value of condition (3) is lower than the lower limit, the refractive power of the second lens group G2 or the third lens group G3, which is a variable magnification group, needs to be increased and the overall power balance of the relay lens system RL will be destroyed, making it difficult to correct various aberrations such as spherical aberration. In order to ensure the effect of the practice mode of the invention, the optimal lower limit of the condition (3) may be 0.3.

The telescope TLS of the practice mode of the invention, the lens which closest to the object side of the eyepiece system EP may be a negative lens (i.e. concave lens, or lens with negative refractive power) (hereinafter named negative lens). The fifth lens group G5 of the relay lens system RL is with positive refractive power making the incident angle of the peripheral light of the second image plane IM2 smoother than before. In this regard, if a conventional eyepiece system is used, it is difficult to ensure a long eye relief (an interval from the lens surface closet to the eye point of the eyepiece system EP to the eye point). By arranging the negative lens of the eyepiece system EP closest to the object side and positioning behind the second image plane IM2 (eye point side), the peripheral light incident on the second image plane IM2 can be widened and long eye relief can also be ensured.

Also in this situation, the following condition (4) can be satisfied:

$$0 \leq de/fe<0.7 \qquad (4);$$

wherein fe is an effective focal length of the eyepiece system EP and de is an interval from an image plane (that is, the second image plane IM2) which is between the relay lens system RL and the eyepiece system EP to an object side surface of the negative lens of the eyepiece system.

Condition (4) defines the interval from the second image plane IM2 to the object side surface of the lens of the eyepiece system EP closest to the object side. By satisfying condition (4), a long eye relief can be ensured.

When the value of condition (4) exceeds the upper limit, the interval from the second image plane IM2 to the lens surface of the eyepiece system EP closest to the object side will become lager. Therefore, it is difficult to widen the peripheral light incident on the second image plane IM2 by using the negative lens of the eyepiece system EP, and it is also difficult to ensure a long eye relief. In addition, when the interval from the second image plane IM2 to the lens surface of the eyepiece system EP closest to the object side becomes larger, in order to widen the peripheral light incident on the second image plane IM2, it can be considered as the lens which is on the rear side (eye point side) of the eyepiece system EP moves. However, because the principal point position of the eyepiece system EP changes, the negative lens on the rear side of the eyepiece system EP is difficult to move. In order to ensure the effect of the practice mode of the invention, the optimal upper limit of the condition (4) may be 0.4.

When the value of condition (4) is lower than the lower limit, the second image plane IM2 and the negative lens of the eyepiece system EP interfere with each other. In order to ensure the effect of the practice mode of the invention, the optimal lower limit of the condition (4) may be greater than 0.1.

The telescope TLS of the practice mode of the invention can satisfy the following condition (5):

$$0.3<f2/f3<1.5 \qquad (5);$$

wherein f2 is an effective focal length of the second lens group G2 and f3 is an effective focal length of the third lens group G3.

Condition (5) defines the ratio of the effective focal length of the second lens group G2 to the third lens group G3. By satisfying condition (5), various aberrations such as spherical aberration can be well corrected.

When the value of condition (5) exceeds the upper limit, the refractive power balance between the second lens group G2 and the third lens group G3 will be damaged, making it difficult to correct various aberrations such as spherical aberration. In order to ensure the effect of the practice mode of the invention, the optimal upper limit of the condition (5) may be 1.2.

When the value of condition (5) lower than the lower limit, the refractive power balance between the second lens group G2 and the third lens group G3 will be damaged, making it difficult to correct various aberrations such as spherical aberration. In order to ensure the effect of the practice mode of the invention, the optimal lower limit of the condition (5) may be 0.6.

The telescope TLS of the practice mode of the invention can satisfy the following condition (6):

$$0.1<f14/(-f4)<0.4 \qquad (6);$$

wherein f4 is an effective focal length of the fourth lens group G4 and f14 is an effective focal length of a combination of the first lens group G1, the second lens group G2, the third lens group G3, and the fourth lens group G4 when the image magnification of the relay lens system RL is maximum Condition (6) defines the ratio of the effective focal length of the fourth lens group G4 to the effective focal length of the combination of the first lens group G1 to the fourth lens groups G4. By satisfying condition (6), various aberrations such as distortion can be well corrected.

When the value of condition (6) exceeds the upper limit, the refractive power balance of the fourth lens group G4 with respect to the first lens group G1 to the fourth lens groups G4 will be damaged, making it difficult to correct various aberrations such as distortion. In order to ensure the effect of the practice mode of the invention, the optimal upper limit of the condition (6) may be 0.3.

When the value of condition (6) is lower than the lower limit, the refractive power balance of the fourth lens group G4 with respect to the first lens group G1 to the fourth lens group G4 will be damaged, making it difficult to correct various aberrations such as distortion.

Figure 3:
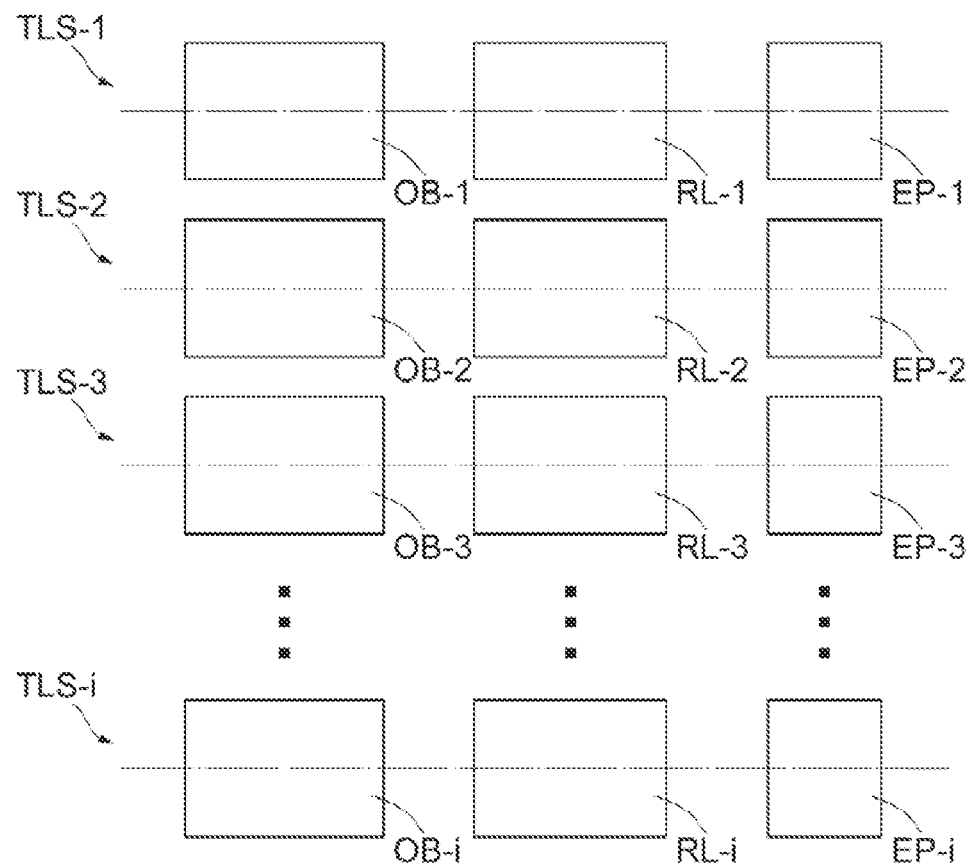
FIG. 3 is a schematic diagram of a telescope series of a practice mode of the invention.

Next, plural telescopes series of the practice mode of the invention will be explained with reference to FIG. 3. The plural telescopes series in the practice mode of the invention includes plural telescopes which include at least a first telescope TLS-1 and a second telescope TLS-2. FIG. 3 shows that the i pieces telescope series includes a first telescope TLS-1, a second telescope TLS-2, a third telescope TLS-3 ..., and a i-th telescope TLS-1. Furthermore, in FIG. 3, although i is an integer greater than or equal to 4, it is also possible for i to be 2 or 3.

The first telescope TLS-1 includes a first objective lens system OB-1, a first relay lens system RL-1, and a first eyepiece system EP-1, all of which are arranged in order from an object side (observation object side), wherein the first telescope TLS-1 has the same configuration as the telescope TLS of the practice mode of the invention. The first objective lens system OB-1 collects light emitted from an object (observation object) to forms an inverted image of the object on a first image plane (not shown in FIG. 3). The first relay lens system RL-1 forms the inverted image formed from the first objective lens system OB-1 into an upright image again on the second image plane (not shown in FIG. 3).

The detailed illustration of the first relay lens system RL-1 is omitted but is the same as the relay lens system of the previous practice mode. The first relay lens system RL-1 includes a first lens group G1 with positive refractive power, a second lens group G2 with positive refractive power, a third lens group G3 with positive refractive power, a fourth lens group G4 with negative refractive power, and a fifth lens group G5 with positive refractive power, all of which are arranged in order from the object side. By moving the second lens group G2 and the third lens group G3 along an optical axis and fixing the first image plane and the second image plane, the image magnification of the first relay lens system RL-1 can be changed. Thereby, the first relay system RL-1 can reimage the inverted image, which is formed by the first objective lens system OB-1, toward the first eyepiece system EP-1 and with different magnifications. That is, the magnification of the (first) telescope can be changed by changing the image magnification of the first relay lens system RL-1.

The second telescope TLS-2 includes a second objective lens system OB-2, a second relay lens system RL-2, and a second eyepiece system EP-2, all of which are arranged in order from an object side (observation object side), wherein the second telescope TLS-2 has the same configuration as the telescope TLS of the previous practice mode. The second objective lens system OB-2 collects light emitted from an object (observation object) to forms an inverted image of the object on a first image plane (not shown in FIG. 3). The second relay lens system RL-2 forms the inverted image formed from the second objective lens system OB-2 into an upright image again on the second image plane (not shown in FIG. 3).

The second relay lens system RL-2 is composed of the same lens groups as the first relay lens system RL-1. By moving the second lens group G2 and the third lens group G3 along an optical axis and fixing the first image plane and the second image plane, the image magnification of the second relay lens system RL-2 can be changed. Thereby, the second relay system RL-2 can reimage the inverted image, which is formed by the second objective lens system OB-2, toward the second eyepiece system EP-2 and with different magnifications. That is, the magnification of the second telescope can be changed by changing the image magnification of the second relay lens system RL-2.

The third telescope TLS-3 includes a third objective lens system OB-3, a third relay lens system RL-3, and a third eyepiece system EP-3, all of which are arranged in order from an object side (observation object side), wherein the third telescope TLS-3 has the same configuration as the telescope TLS of the previous practice mode. The third objective lens system OB-3 collects light emitted from an object (observation object) to forms an inverted image of the object on a first image plane (not shown in FIG. 3). The third relay lens system RL-3 forms the inverted image formed from the third objective lens system OB-3 into an upright image again on the second image plane (not shown in FIG. 3).

The third relay lens system RL-3 is composed of the same lens groups as the first relay lens system RL-1. By moving the second lens group G2 and the third lens group G3 along an optical axis and fixing the first image plane and the second image plane, the image magnification of the third relay lens system RL-3 can be changed. Thereby, the third relay system RL-3 can reimage the inverted image, which is formed by the third objective lens system OB-3, toward the third eyepiece system EP-3 and with different magnifications. That is, the magnification of the third telescope can be changed by changing the image magnification of the third relay lens system RL-3.

In this way, the i-th telescope TLS-i includes a i-th objective lens system OB-i, a i-th relay lens system RL-i, and a i-th eyepiece system EP-i, all of which are arranged in order from an object side (observation object side), wherein the i-th telescope TLS-i has the same configuration as the telescope TLS of the previous practice mode. The i-th objective lens system OB-i collects light emitted from an object (observation object) to forms an inverted image of the object on a first image plane (not shown in FIG. 3). The i-th relay lens system RL-i forms the inverted image formed from the i-th objective lens system OB-i into an upright image again on the second image plane (not shown in FIG. 3).

The i-th relay lens system RL-i is composed of the same lens groups as the first relay lens system RL-1. By moving the second lens group G2 and the third lens group G3 along an optical axis and fixing the first image plane and the second image plane, the image magnification of the i-th relay lens system RL-i can be changed. Thereby, the i-th relay system RL-i can reimage the inverted image, which is formed by the i-th objective lens system OB-1, toward the first eyepiece system EP-1 and with different magnifications. That is, the magnification of the i-th telescope can be changed by changing the image magnification of the i-th relay lens system RL-i.

In the telescope series of the practice mode of the invention, the second relay lens system RL-2, the third relay lens system RL-3 . . . , and the i-th relay lens system RL-i etc. are composed of the same lens group as the first relay lens system RL-1. The first relay lens system RL-1 has the same configuration as the relay lens system RL of the previous practice mode and can achieve a higher image magnification. Therefore, the relay lens system can be standardized and the overall optical performance of the telescope series can be stabilized. In addition, by way of the standardization of the relay lens system, the production efficiency of the telescope can be improved and the production cost can also be reduced.

Here, the magnification of the first telescope TLS-1 is MT1, the magnification of the second telescope TLS-2 is MT2, the magnification of the third telescope TLS-3 is MT3, and the magnification of the i-th telescope TLS-i is MTi. The effective focal length of the first objective lens system OB-1 is fo1, the effective focal length of the second objective lens system OB-2 is fo2, the effective focal length of the third objective lens system OB-3 is fo3, and the effective focal length of the i-th objective lens system OB-i is foi. The image magnification of the first relay lens system RL-1, the second lens system RL-2, the third relay lens system RL-3, the third relay lens system RL-3, and the i-th relay lens system RL-i are Mrz. The effective focal length of the first eyepiece system EP-1 is fe1, the effective focal length of the second eyepiece system EP-2 is fe2, the effective focal length of the third eyepiece system EP-3 is fe3, and the effective focal length of the i-th eyepiece system EP-i is fei. At this time, the following equations (A1), (A2), (A3), (Ai) can be obtained:

$$MT1 = (fo1/fe1) \times Mrz \quad (A1);$$

$$MT2 = (fo2/fe2) \times Mrz \quad (A2);$$

$$MT3 = (fo3/fe3) \times Mrz \quad (A3);$$

$$MTi = (foi/fei) \times Mrz \quad (Ai);$$

It can be known from each equation (A1), (A2), (A3), and (Ai) that if (fo1/fe1), (fo2/fe2), (fo3/fe3), and (foi/fei) represent magnifications which are different to each other, then the magnification MT1 of the first telescope TLS-1, magnification MT2 of the second telescope TLS-2, magnification MT3 of the third telescope TLS-3, and magnification MTi of the i-th telescope TLS-I can be in different magnification ranges.

For example, while the effective focal length fe1 of the first eyepiece system EP-1, the effective focal length fe2 of the second eyepiece system EP-2, the effective focal length fe3 of the third eyepiece system EP-3, and the effective focal length of the i-th eyepiece system are the same, the effective focal length fo1 of the first objective lens system OB-1, the effective focal length fo2 of the second objective lens system OB-2, the effective focal length fo3 of the third objective lens system OB-3, and the effective focal length foi of the i-th objective lens system OB-I can be different. In this way, as long as changes the effective focal length of the objective lens system in design, it is easy to make the telescope series of different magnification ranges is consistent.

In addition, while the effective focal length fo1 of the first objective lens system OB-1, the effective focal length fo2 of the second object system OB-2, the effective focal length fo3 of the third object system OB-3, and the effective focal length foi of the i-th object system OB-i are the same, the effective focal length fe1 of the first eyepiece system EP-1, the effective focal length fe2 of the second eyepiece system EP-2, the effective focal length fe3 of the third eyepiece system EP-3, and the effective focal length fei of the i-th eyepiece system EP-i can be different. In this way, as long as changes the effective focal length of the eyepiece system in design, it is easy to make the telescope series of different magnification ranges is consistent.

In addition, while the effective focal length fo1 of the first objective lens system OB-1, the effective focal length fo2 of the second object system OB-2, the effective focal length fo3 of the third object system OB-3, and the effective focal length foi of the i-th object system OB-i are not the same, the effective focal length fe1 of the first eyepiece system EP-1, the effective focal length fe2 of the second eyepiece system EP-2, the effective focal length fe3 of the third eyepiece system EP-3, and the effective focal length fei of the i-th eyepiece system EP-i can be different. In this way, as long as changes the effective focal length of the objective lens system and eyepiece system in design, it is easy to make the telescope series of different magnification ranges is consistent.

In the telescope series of the practice mode of the invention, the first telescope TLS-1, the second telescope TLS-2, the third telescope TLS-3 . . . , and the i-th telescope TLS-i are possible replaced respectively with other objective lens system which is with different effective focal length. In this way, the observer can change the magnification range of the telescope. For example, in the first telescope TLS-1 wherein the first objective lens system OB-1 is replaced with the second objective lens system OB-2 having different effective focal length. The second objective lens system OB-2 can be used as the first objective lens system OB-1. In the second telescope TLS-2 wherein the second objective lens system OB-2 is replaced with the first objective lens system OB-1 having a different effective focal length. The first objective lens system OB-1 can be used as the second objective lens system OB-2.

In the telescope series of the practice mode of the invention, the first telescope TLS-1, the second telescope TLS-2, the third telescope TLS-3, and the i-th telescope TLS-i are possible replaced respectively with other eyepiece system which is with different effective focal length. In this way, the observer can change the magnification range of the telescope. For example, in the first telescope TLS-1 wherein the first eyepiece system EP-1 is replaced with the second eyepiece system EP-2 having different effective focal length. The second eyepiece system EP-2 can be used as the first eyepiece system EP-1. In the second telescope TLS-2 wherein the second eyepiece system EP-2 is replaced with the first eyepiece system EP-1 having different effective focal length. The first eyepiece system EP-1 can be used as the second eyepiece system EP-2. Furthermore, the first telescope TLS-1, the second telescope TLS-2, the third telescope TLS-3, and the i-th telescope TLS-i are not only replaced respectively with other different eyepiece system having different effective focal length but also possible replaced respectively with other different objective lens system having different effective focal length.

In the telescope series of the practice mode of the invention, four or more telescopes are installed. However, the number of the telescopes is not limited thereto. The number of telescopes may be two or three.

Embodiments

The following description is based on the drawings of the telescope TLS of the embodiments of the present practice mode. FIG. 4, FIG. 7, FIG. 10, and FIG. 13 show the movement of the lenses when the magnification of the telescopes TLS {TLS(1)-TLS(4)} of the first to fourth embodiments change from the lowest magnification to the highest magnification. In FIG. 4, FIG. 7, FIG. 10, and FIG. 13, each lens symbol of the objective lens system OB is represented by a combination of B and a number, each lens group of the relay lens system RL is represented by a combination of a symbol G and a number and each lens of the relay lens system RL is represented by a combination of a symbol L and a number, and each lens of the eyepiece system EP is represented by a combination of a symbol E and a number. In this situation, in order to prevent the type and value of symbol and number from becoming larger and more complicated, each embodiment uses a combination of independent symbol and number to represent lens. Therefore, even if the same combination of symbol and number is used for different embodiments, it does not mean that their composition is the same.

The following Table 1 to Table 4 show parameters for the first to fourth embodiments. C line (wavelength $\lambda$=656.3 nm), d line (wavelength $\lambda$=587.6 nm), F line (wavelength $\lambda$=486.1 nm), and g line (wavelength $\lambda$=435.8 nm) are selected to calculate the aberration characteristics for embodiment 1 to embodiment 4.

In table [Overall Parameters], fo represents the effective focal length of the objective lens system OB, fe represents the effective focal length of the eyepiece system EP, $\Phi5$ represents the maximum outer diameter of the fifth lens group G5, $\Phi23$ represents the maximum outer diameter among the second lens group G2 and the third lens group G3, dG2 represents the maximum amount of movement of the second lens group G2 when the image magnification of the relay lens system RL changes from the lowest magnification to the highest magnification, L represents the total length of the relay lens system RL, de represents the interval from an image plane (that is, the second image plane IM2) which is between the relay lens system RL and the eyepiece system EP to the object side surface of the negative lens of the eyepiece system EP, f1 is an effective focal length of the first lens group G1, f2 is an effective focal length of the second lens group G2, f3 is an effective focal length of the third lens group G3, f4 is an effective focal length of the fourth lens group G4, f5 is an effective focal length of the fifth lens group G5, and f14 is an effective focal length of a combination of the first lens group G1, the second lens group G2, the third lens group G3, and the fourth lens group G4 when the image magnification of the relay lens system RL is maximum.

In table [Lens Data], the surface number indicates the order of the lens surface from the object side, R represents the radius of curvature corresponding to each surface number (a convex surface on the object side is a positive value), D represents the lens thickness or air gap along the optical axis corresponding to each surface number, nd represents the index of refraction of the d line (wavelength $\lambda$=587.6 nm) of the optical material corresponding to each surface number, vd represents the Abbe number of the d line of the optical material corresponding to each surface number, the effective diameter represents the effective diameter of the lens corresponding to each surface number, and the outer diameter represents the outer diameter of the lens corresponding to each surface number. Also, "∞" of the radius of curvature indicates a flat surface or an aperture. In addition, the index of refraction of air nd=1.00000 is omitted. The effective diameter of the lens is the diameter of the part of the lens through which the peripheral light of the oblique beam passes. The outer diameter of the lens is the diameter of the outer part of the lens.

The table [Variable Data] which shows the air gap corresponds to the image magnification of the relay lens system, wherein air gap is denoted by "Variable" in table [Lens Data].

The table [Zoom Data] shows the magnification and half field of view of the telescope when the image magnification of the relay lens system is the lowest and highest and fr represents the effective focal length of the relay lens system.

The table [Condition Value] shows the corresponding condition value of each condition.

Below, unless otherwise specified, the parameter values of the effective focal length f, radius of curvature R, surface thickness D, and other length are in mm. Because the optical system can be scaled up or down to obtain the same optical performance, the invention is not limited thereto.

So far, the description of table is suitable for all the embodiments and will not be repeated below.

The First Embodiment

Figure 4:
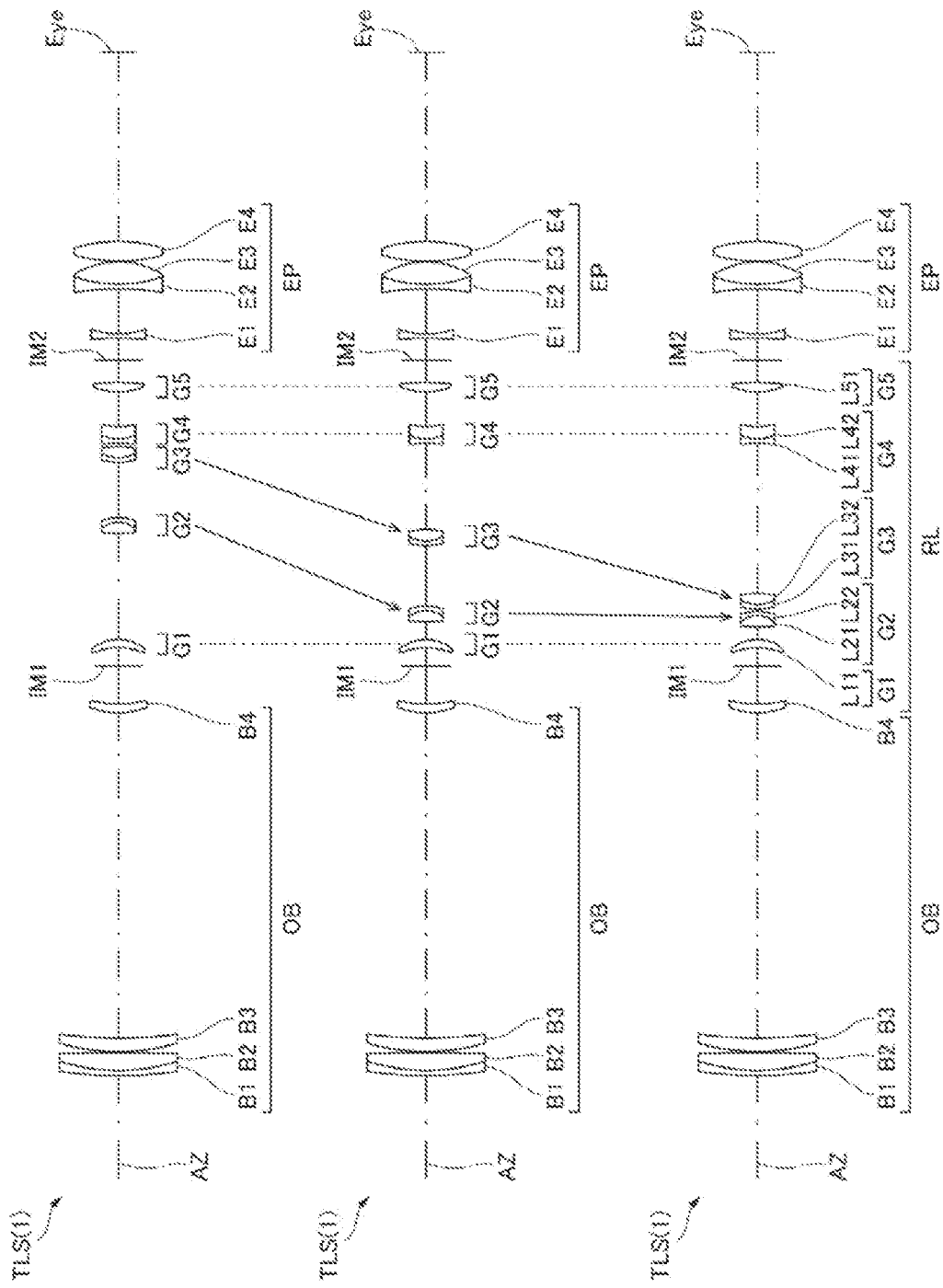
FIG. 4 is a schematic diagram shows movement of lenses of a telescope from the lowest magnification to the highest magnification in accordance with a first embodiment of the invention.
Figure 5:
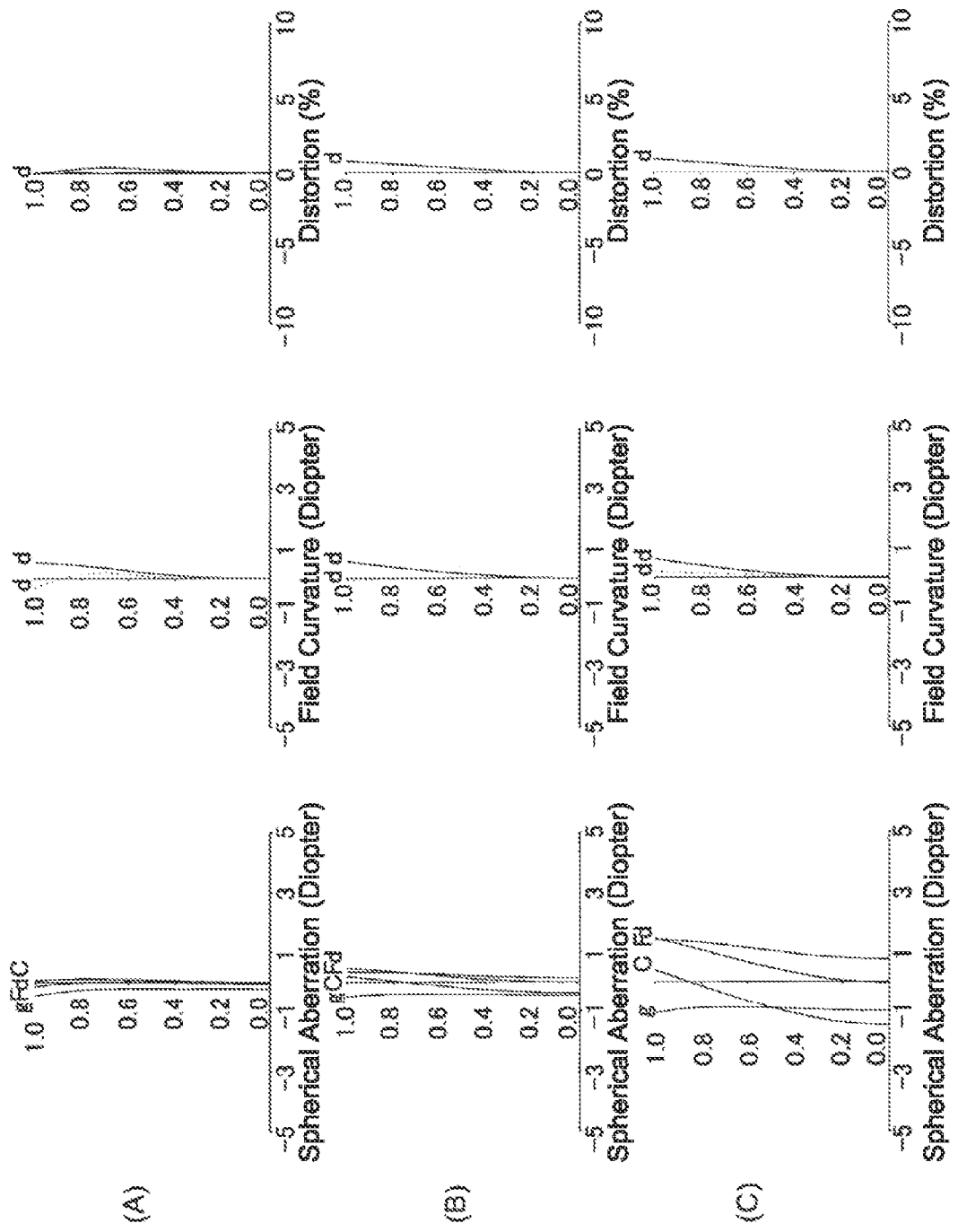
FIGS. 5(A), 5(B), and 5(C) show various aberration diagrams when the magnification of the telescope is 3 times, 9 times, and 18 times respectively in accordance with the first embodiment of the invention.
Figure 6:
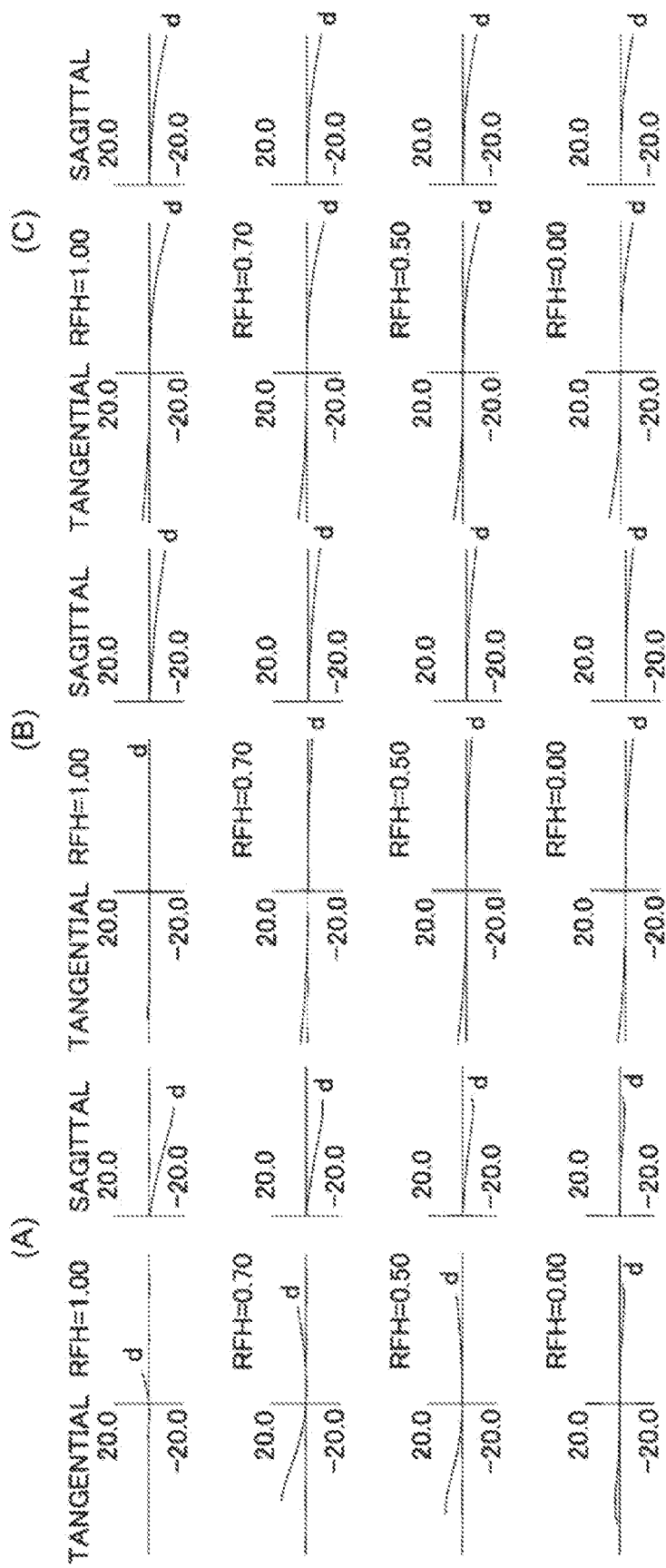
FIGS. 6(A), 6(B), and 6(C) show lateral aberration diagrams when the magnification of the telescope is 3 times, 9 times, and 18 times respectively in accordance with the first embodiment of the invention.

The first embodiment is described with reference to FIG. 4 to FIG. 6 and Table 1. FIG. 4 is a schematic diagram shows movement of lenses of a telescope TLS(1) when the magnification of the telescope TLS(1) is changed from 3 times, 9 times, to 18 times. In the first embodiment, the telescope TLS(1) includes an objective lens system OB, a relay lens system RL, and an eyepiece system EP, all of which are arranged in order from an object side. A first image plane IM1 is located between the objective lens system OB and the relay lens system RL. A second image plane IM2 is located between the relay lens system RL and the eyepiece system EP. The objective lens system OB collects the light emitted from an object and forms an inverted image of the object on the first image plane IM1. The inverted image formed by the objective lens system OB is again formed an upright image on the second image plane IM2 by the relay lens system RL.

The objective lens system OB includes a cemented lens of a lens B1 with negative refractive power having a convex surface facing the object side and a concave surface facing the eye point side and a lens B2 with positive refractive power having a convex surface facing the object side and another convex surface facing the eye point side, a lens B3 with positive refractive power having a convex surface facing the object side and a concave surface facing the eye point side, and a lens B4 with positive refractive power having a convex surface facing the object side and a concave surface facing the eye point side, all of which are arranged in order from the object side.

The relay lens system RL includes a first lens group having positive refractive power, a second lens group G2 having positive refractive power, a third lens group G3 having positive refractive power, a fourth lens group G4 having negative refractive power, and a fifth lens group G5 having positive refractive power, all of which are arranged in order from the object side. By moving the second lens group G2 and the third lens group G3 along an optical axis while fixing the first image plane IM1 and the second image plane IM2, the image magnification of the relay lens system RL can be changed. In addition, when the image magnification of the relay lens system RL is changed from low magnification to high magnification, the second lens group G2 and the third lens group G3 respectively move toward the object side along the optical axis AZ. In addition, when the image magnification of the relay lens system RL is changed, the first lens group G1, the fourth lens group G4, and the fifth lens group G5 are fixed on the optical axis AZ.

The first lens group G1 is composed of a lens L11 with positive refractive power having a concave surface facing the object side and a convex surface facing the eye point side. The second lens group G2 is composed of a cemented lens of a lens L21 with positive refractive power having a convex surface facing the object side and another convex surface facing the eye point side and a lens L22 with negative refractive power having a concave surface facing the object side and a convex surface facing the eye point side. The third lens group G3 is composed of a cemented lens of a lens L31 with negative refractive power having a convex surface facing the object side and a concave surface facing the eye point side and a lens L32 with positive refractive power having a convex surface facing the object side and another convex surface facing the eye point side. The fourth lens group G4 is composed of a cemented lens of a lens L41 with negative refractive power having a concave surface facing the object side and another concave surface facing the eye point side and a lens L42 with positive refractive power having a convex surface facing the object side and a concave surface facing the eye point side. The fifth lens group G5 is composed of a lens L51 with positive refractive power having a convex surface facing the object side and another convex surface facing the eye point side.

The eyepiece system EP is composed of a E1 with negative refractive power having a concave surface facing the object side and another concave surface facing the eye point side, a cemented lens of a lens E2 with negative refractive power having a concave surface facing the object side and another concave surface facing the eye point side and a lens E3 with positive refractive power having a convex surface facing the object side and another convex surface facing the eye point side, and a lens E4 with positive refractive power having a convex surface facing the object side and another convex surface facing the eye point side, all of which are arranged in order from the object side.

Table 1 below shows the parameter values of the telescope of the first embodiment.

TABLE 1

[All Parameters]

| fo = 152.2 | fe = 50.8 | Φ5 = 21 |
| Φ23 = 14.5 | dG2 = 39.95 | L = 137.3 |
| de = 10.00 | f1 = 57.5 | f2 = 39.2 |
| f3 = 43.1 | f4 = 37.9 | f5 = 48.5 |
| f14 = 6.9 | | |

[Lens Data]

| Surface Number | R | D | nd | vd | Effective Diameter | Outer Diameter |
| --- | --- | --- | --- | --- | --- | --- |
| 1 | 169.650 | 2.37 | 1.67270 | 32.19 | 50 | 51 |
| 2 | 86.500 | 8.07 | 1.49700 | 81.64 | 50 | 51 |
| 3 | −567.240 | 0.47 | | | 50 | 51 |
| 4 | 94.930 | 6.01 | 1.51680 | 64.13 | 50 | 51 |
| 5 | 191.690 | 146.15 | | | 50 | 51 |
| 6 | 31.700 | 4.00 | 1.51680 | 64.13 | 23 | 24 |
| 7 | 48.960 | 17.05 | | | 23 | 24 |
| 9 | ∞ | 8.30 | | | 19 | 20(The First Image Plane) |
| 10 | −28.000 | 3.70 | 1.75520 | 27.57 | 21 | 22 |
| 11 | −17.990 | D1(Variable) | | | 21 | 22 |
| 12 | 160.680 | 5.00 | 1.60311 | 60.69 | 13.5 | 14.5 |
| 13 | −10.830 | 2.00 | 1.75520 | 27.57 | 13.5 | 14.5 |

TABLE 1-continued

| | | | | | | |
|---|---|---|---|---|---|---|
| 14 | −21.190 | D2(Variable) | | | 13.5 | 14.5 |
| 15 | 27.880 | 2.00 | 1.75520 | 27.57 | 13.5 | 14.5 |
| 16 | 14.960 | 5.00 | 1.51680 | 64.13 | 13.5 | 14.5 |
| 17 | −41.680 | D3(Variable) | | | 13.5 | 14.5 |
| 18 | −61.170 | 2.00 | 1.51680 | 64.13 | 13.5 | 14.5 |
| 19 | 16.820 | 5.50 | 1.75520 | 27.57 | 13.5 | 14.5 |
| 20 | 23.250 | 15.69 | | | 13.5 | 14.5 |
| 21 | 28.400 | 4.00 | 1.48749 | 70.32 | 20 | 21 |
| 22 | −135.190 | 10.00 | | | 20 | 21 |
| 23 | ∞ | 10.00 | | | 20 | 21(The Second Image Plane) |
| 24 | −150.000 | 2.00 | 1.51680 | 64.13 | 21 | 22 |
| 25 | 35.960 | 20.34 | | | 21 | 22 |
| 26 | −112.700 | 2.00 | 1.74077 | 27.74 | 38 | 39 |
| 27 | 52.880 | 10.00 | 1.51680 | 64.13 | 38 | 39 |
| 28 | −36.940 | 0.30 | | | 38 | 39 |
| 29 | 64.470 | 9.00 | 1.60311 | 60.69 | 38.1 | 39 |
| 29 | −65.020 | | | | 38 | 39 |

[Variable Data]

| Image Magnification | D1 | D2 | D3 |
|---|---|---|---|
| 1 | 47.76 | 24.80 | 1.50 |
| 3 | 10.98 | 27.26 | 35.83 |
| 6 | 7.81 | 1.00 | 65.25 |

[Zoom Data]

| | Minimum Magnification | Maximum Magnification |
|---|---|---|
| Magnification | 3.0 | 18.0 |
| Half Field of View(degree) | 3.54 | 0.59 |
| fr | 155.9 | 35.5 |

[Condition Value]

| | |
|---|---|
| Condition (1) | (−f4)/f5 = 0.78 |
| Condition (2) | Φ23/Φ5 = 0.69 |
| Condition (3) | dG2/L = 0.29 |
| Condition (4) | de/fe = 0.20 |
| Condition (5) | f2/f3 = 0.91 |
| Condition (6) | f14/(−f4) = 0.18 |

FIG. 5(A), FIG. 5(B), and FIG. 5(C) are aberration diagrams when the magnification of the telescope of the first embodiment is 3 times, 9 times, and 18 times respectively. FIG. 6(A), FIG. 6(B), and FIG. 6(C) are the lateral aberration diagrams when the magnification of the telescope of the first embodiment is 3 times, 9 times, and 18 times, respectively. In each aberration diagram, C is C line (wavelength λ=656.3 nm), d is d line (wavelength λ=587.6 nm), F is F line (wavelength λ=486.1 nm), and g is g line (wavelength λ=435.8 nm) indicate the corresponding aberration respectively. In field curvature diagram (astigmatism diagram), the solid line represents the sagittal image surface and the broken line represents the meridional image surface. In the lateral aberration diagram, RFH represents the relative field height. In addition, the following aberration diagrams of the respective embodiment use the same symbol as in the first embodiment and the repeated descriptions are omitted.

It can be seen from the various aberration diagrams that the various aberration of the telescope of the first embodiment can be well corrected and has excellent image performance from a low magnification state to a high magnification state.

The Second Embodiment

Figure 7:
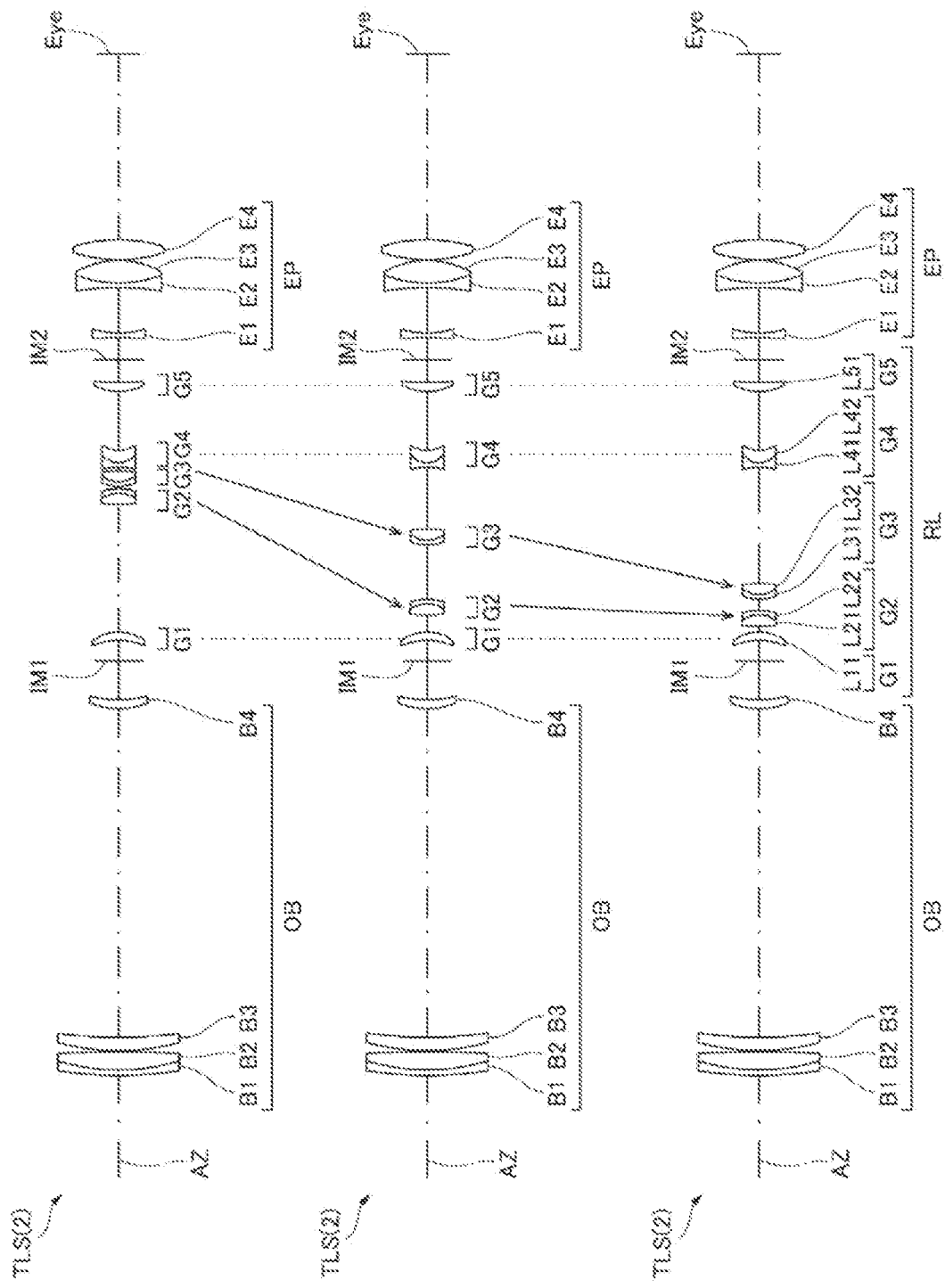
FIG. 7 is a schematic diagram shows movement of lenses of a telescope from the lowest magnification to the highest magnification in accordance with a second embodiment of the invention.
Figure 8:
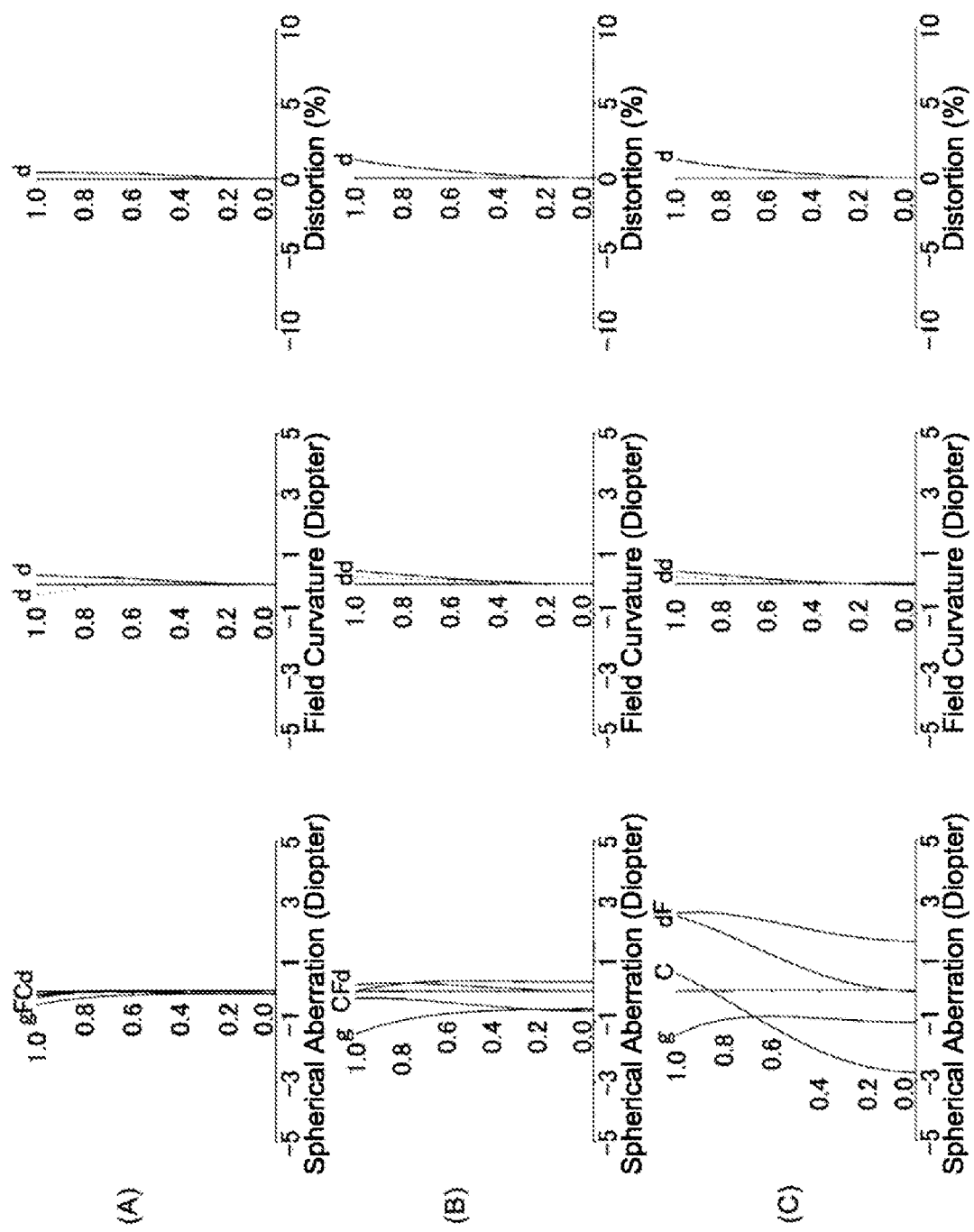
FIGS. 8(A), 8(B), and 8(C) show various aberration diagrams when the magnification of the telescope is 3 times, 12 times, and 24 times respectively in accordance with the second embodiment of the invention.
Figure 9:
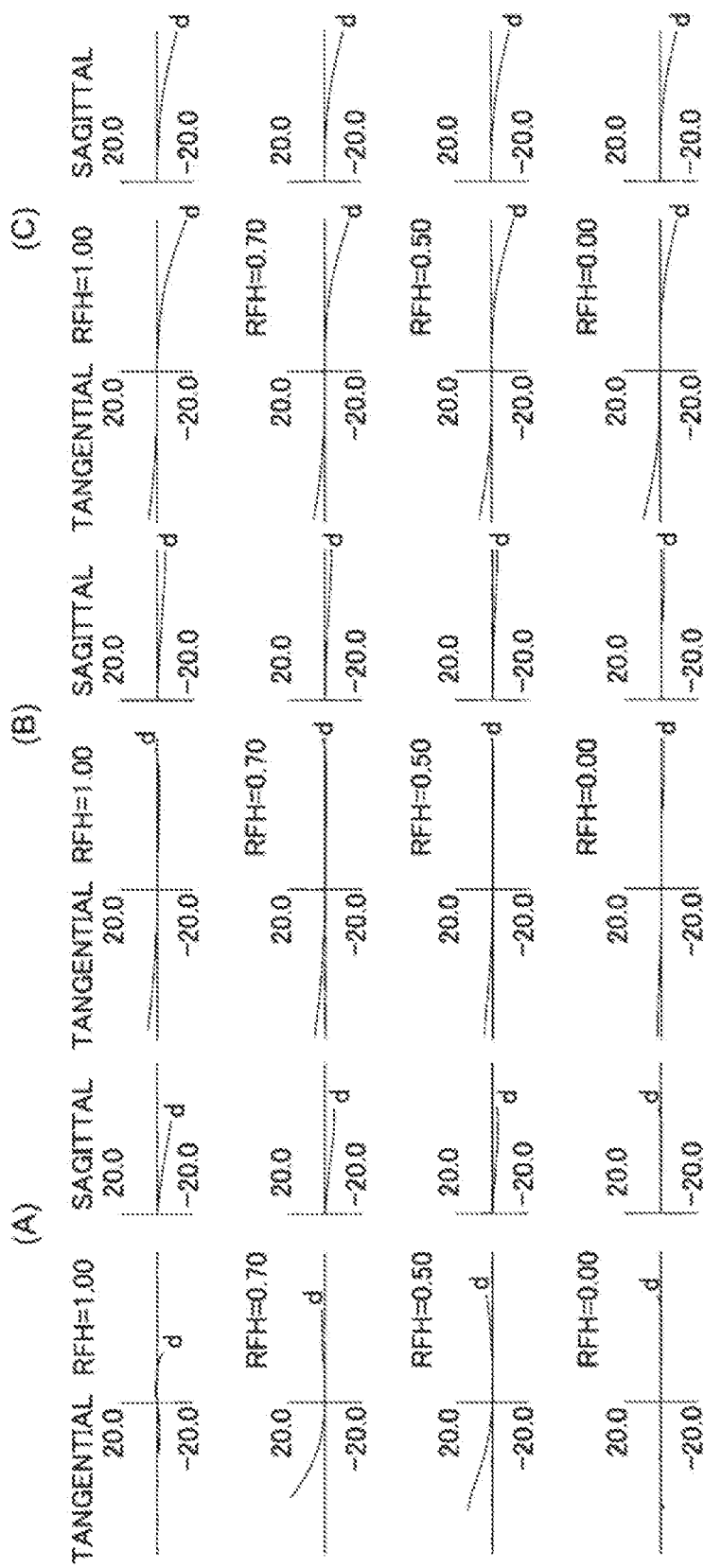
FIGS. 9(A), 9(B), and 9(C) show lateral aberration diagrams when the magnification of the telescope is 3 times, 12 times, and 24 times respectively in accordance with the second embodiment of the invention.

The second embodiment is described with reference to FIG. 7 to FIG. 9 and Table 2. FIG. 7 is a schematic diagram shows movement of lenses of a telescope TLS(2) when the magnification of the telescope TLS(2) is changed from 3 times, 12 times, to 24 times. In the second embodiment, the telescope TLS(2) includes an objective lens system OB, a relay lens system RL, and an eyepiece system EP, all of which are arranged in order from an object side. A first image plane IM1 is located between the objective lens system OB and the relay lens system RL. A second image plane IM2 is located between the relay lens system RL and the eyepiece system EP. The objective lens system OB collects the light emitted from an object and forms an inverted image of the object on the first image plane IM1. The inverted image formed by the objective lens system OB is again formed an upright image on the second image plane IM2 by the relay lens system RL.

The objective lens system OB includes a cemented lens of a lens B1 with negative refractive power having a convex surface facing the object side and a concave surface facing the eye point side and a lens B2 with positive refractive power having a convex surface facing the object side and another convex surface facing the eye point side, a lens B3 with positive refractive power having a convex surface facing the object side and a concave surface facing the eye point side, and a lens B4 with positive refractive power having a convex surface facing the object side and a concave surface facing the eye point side, all of which are arranged in order from the object side.

The relay lens system RL includes a first lens group having positive refractive power, a second lens group G2 having positive refractive power, a third lens group G3 having positive refractive power, a fourth lens group G4 having negative refractive power, and a fifth lens group G5 having positive refractive power, all of which are arranged in order from the object side. By moving the second lens group G2 and the third lens group G3 along an optical axis while fixing the first image plane IM1 and the second image plane IM2, the image magnification of the relay lens system RL can be changed. In addition, when the image magnification of the relay lens system RL is changed from low magnification to high magnification, the second lens group G2 and the third lens group G3 move toward the object side along the optical axis AZ respectively. In addition, when the image magnification of the relay lens system RL is changed, the first lens group G1, the fourth lens group G4, and the fifth lens group G5 are fixed on the optical axis AZ.

The first lens group G1 is composed of a lens L11 with positive refractive power having a concave surface facing the object side and a convex surface facing the eye point side. The second lens group G2 is composed of a cemented lens of a lens L21 with positive refractive power having a convex surface facing the object side and another convex surface facing the eye point side and a lens L22 with negative refractive power having a concave surface facing the object side and a convex surface facing the eye point side. The third lens group G3 is composed of a cemented lens of a lens L31 with negative refractive power having a convex surface facing the object side and a concave surface facing the eye point side and a lens L32 with positive refractive power having a convex surface facing the object side and another convex surface facing the eye point side. The fourth lens group G4 is composed of a cemented lens of a lens L41 with negative refractive power having a concave surface facing the object side and another concave surface facing the eye point side and a lens L42 with positive refractive power having a convex surface facing the object side and a concave surface facing the eye point side. The fifth lens group G5 is composed of a lens L51 with positive refractive power having a convex surface facing the object side and a concave surface facing the eye point side.

The eyepiece system EP is composed of a E1 with negative refractive power having a concave surface facing the object side and another concave surface facing the eye point side, a cemented lens of a lens E2 with negative refractive power having a concave surface facing the object side and another concave surface facing the eye point side and a lens E3 with positive refractive power having a convex surface facing the object side and another convex surface facing the eye point side, and a lens E4 with positive refractive power having a convex surface facing the object side and another convex surface facing the eye point side, all of which are arranged in order from the object side.

Table 2 below shows the parameter values of the telescope of the second embodiment.

TABLE 2

| [All Parameters] | | |
|---|---|---|
| fo = 152.2 | fe = 50.8 | Φ5 = 21 |
| Φ23 = 14.5 | dG2 = 51.51 | L = 133.9 |
| de = 10.00 | f1 = 60.1 | f2 = 37.2 |
| f3 = 37.6 | f4 = −21.6 | f5 = 56.2 |
| f14 = 5.5 | | |

| [Lens Data] | | | | | | |
|---|---|---|---|---|---|---|
| Surface Number | R | D | nd | vd | Effective Diameter | Outer Diameter |
| 1 | 169.650 | 2.37 | 1.67270 | 32.19 | 50 | 51 |
| 2 | 86.500 | 8.07 | 1.49700 | 81.64 | 50 | 51 |
| 3 | −567.240 | 0.47 | | | 50 | 51 |
| 4 | 94.930 | 6.01 | 1.51680 | 64.13 | 50 | 51 |
| 5 | 191.690 | 146.15 | | | 50 | 51 |
| 6 | 31.700 | 4.00 | 1.51680 | 64.13 | 23 | 24 |
| 7 | 48.960 | 17.05 | | | 23 | 24 |
| 8 | ∞ | 9.30 | | | 19 | 20(The First Image Plane) |
| 9 | −27.450 | 3.70 | 1.75520 | 27.58 | 21 | 22 |
| 10 | −18.090 | D1(Variable) | | | 21 | 22 |
| 11 | 65.500 | 5.00 | 1.60311 | 60.60 | 13.5 | 14.5 |
| 12 | −12.570 | 2.00 | 1.75520 | 27.58 | 13.5 | 14.5 |
| 13 | −25.000 | D2(Variable) | | | 13.5 | 14.5 |
| 14 | 19.990 | 2.00 | 1.75520 | 27.58 | 13.5 | 14.5 |
| 15 | 10.800 | 5.00 | 1.51680 | 64.17 | 13.5 | 14.5 |
| 16 | −46.970 | D3(Variable) | | | 13.5 | 14.5 |
| 17 | −36.520 | 2.00 | 1.51680 | 64.17 | 13.5 | 14.5 |
| 18 | 8.880 | 5.50 | 1.75520 | 27.58 | 13.5 | 14.5 |
| 19 | 12.420 | 26.13 | | | 13.5 | 14.5 |
| 20 | 21.900 | 4.00 | 1.48749 | 70.41 | 20 | 21 |
| 21 | 102.740 | 10.00 | | | 20 | 21 |

TABLE 2-continued

| | | | | | | |
|---|---|---|---|---|---|---|
| 22 | ∞ | 10.00 | | | 20 | 21(The Second Image Plane) |
| 23 | −150.000 | 2.00 | 1.51680 | 64.13 | 21 | 22 |
| 24 | 35.960 | 20.34 | | | 21 | 22 |
| 25 | −112.700 | 2.00 | 1.74077 | 27.74 | 38 | 39 |
| 26 | 52.880 | 10.00 | 1.51680 | 64.13 | 38 | 39 |
| 27 | −36.940 | 0.30 | | | 38 | 39 |
| 28 | 64.470 | 9.00 | 1.60311 | 60.69 | 38.1 | 39 |
| 29 | −65.020 | | | | 38 | 39 |

[Variable Data]

| Image Magnification | D1 | D2 | D3 |
|---|---|---|---|
| 1 | 56.81 | 1.00 | 1.50 |
| 4 | 11.02 | 24.20 | 24.09 |
| 8 | 5.31 | 5.00 | 49.01 |

[Zoom Data]

| | Minimum Magnification | Maximum Magnification |
|---|---|---|
| Magnification | 3.0 | 24.0 |
| Half Field of View(degree) | 3.54 | 0.44 |
| fr | 86.5 | 18.6 |

[Condition Value]

| | |
|---|---|
| Condition (1) | $(-f4)/f5 = 0.38$ |
| Condition (2) | $\Phi 23/\Phi 5 = 0.69$ |
| Condition (3) | $dG2/L = 0.38$ |
| Condition (4) | $de/fe = 0.20$ |
| Condition (5) | $f2/f3 = 0.99$ |
| Condition (6) | $f14/(-f4) = 0.25$ |

FIG. 8(A), FIG. 8(B), and FIG. 8(C) are aberration diagrams when the magnification of the telescope of the second embodiment is 3 times, 12 times, and 24 times respectively. FIG. 9(A), FIG. 9(B), and FIG. 9(C) are the lateral aberration diagrams when the magnification of the telescope of the second embodiment is 3 times, 12 times, and 24 times respectively. It can be seen from the various aberration diagrams that the various aberration of the telescope of the second embodiment can be well corrected and has excellent image performance from a low magnification state to a high magnification state.

The Third Embodiment

Figure 10:
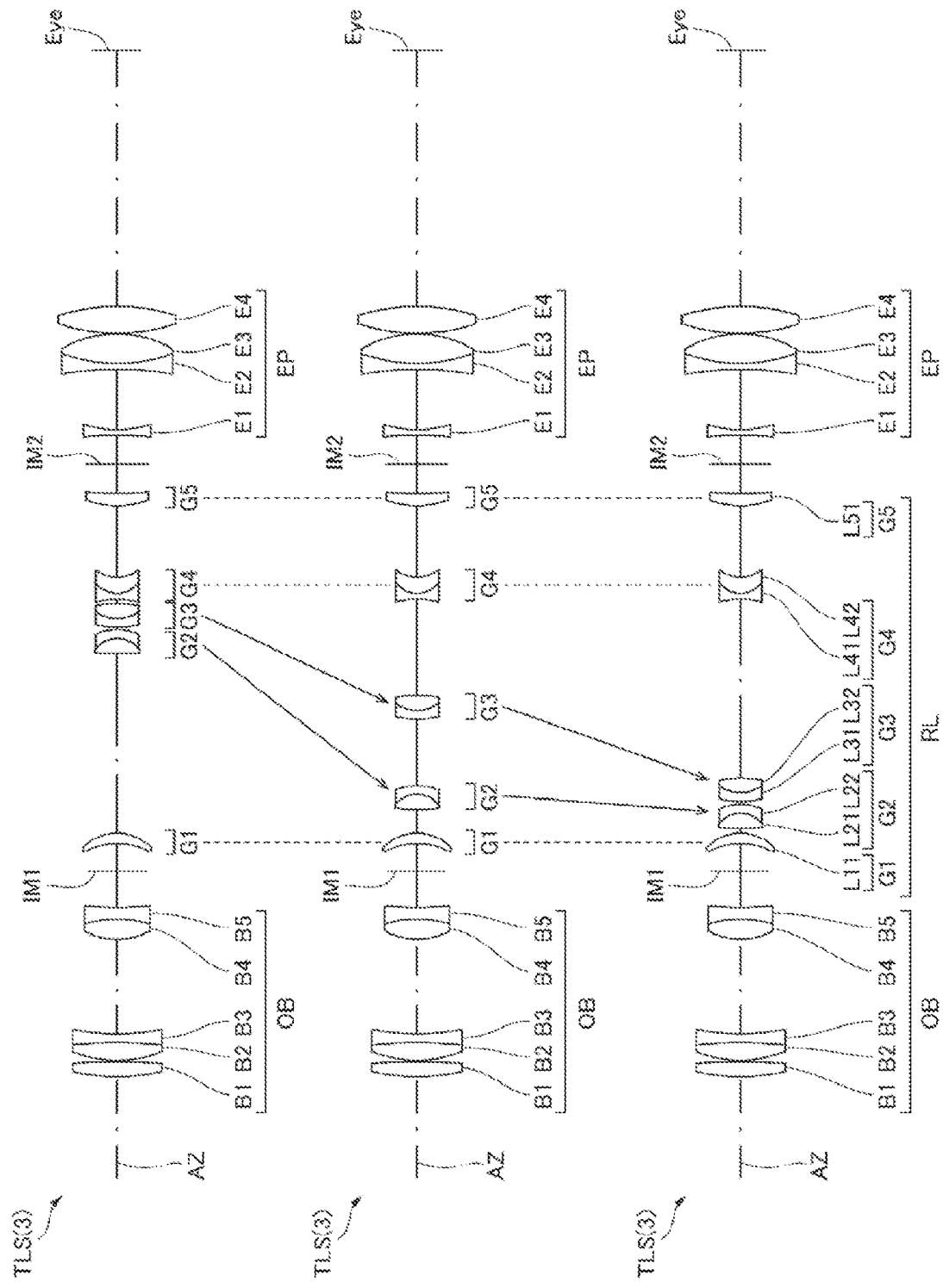
FIG. 10 is a schematic diagram shows movement of lenses of a telescope from the lowest magnification to the highest magnification in accordance with a third embodiment of the invention.
Figure 11:
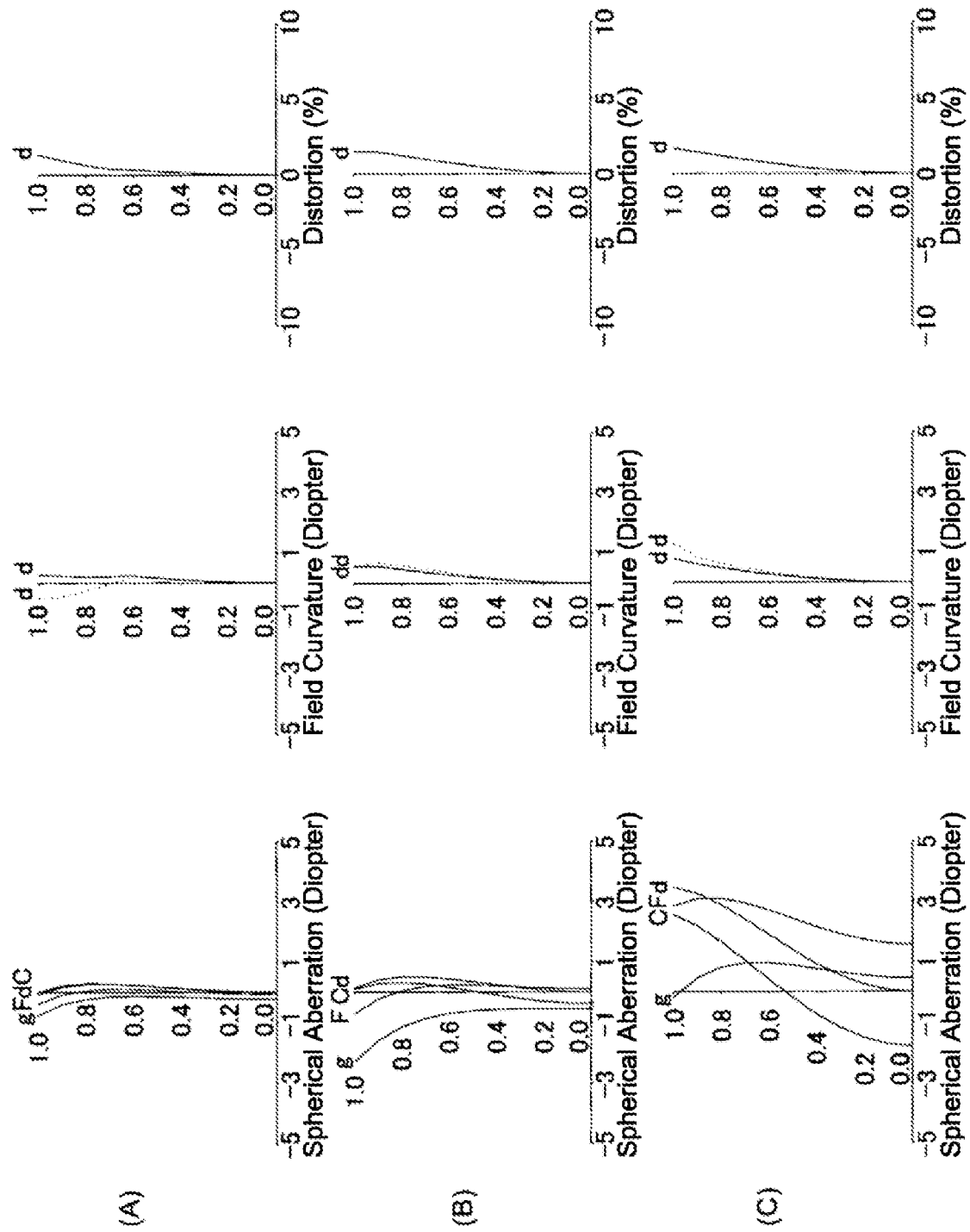
FIGS. 11(A), 11(B), and 11(C) show various aberration diagrams when the magnification of the telescope is 1 time, 5 times, and 10 times respectively in accordance with the third embodiment of the invention.
Figure 12:
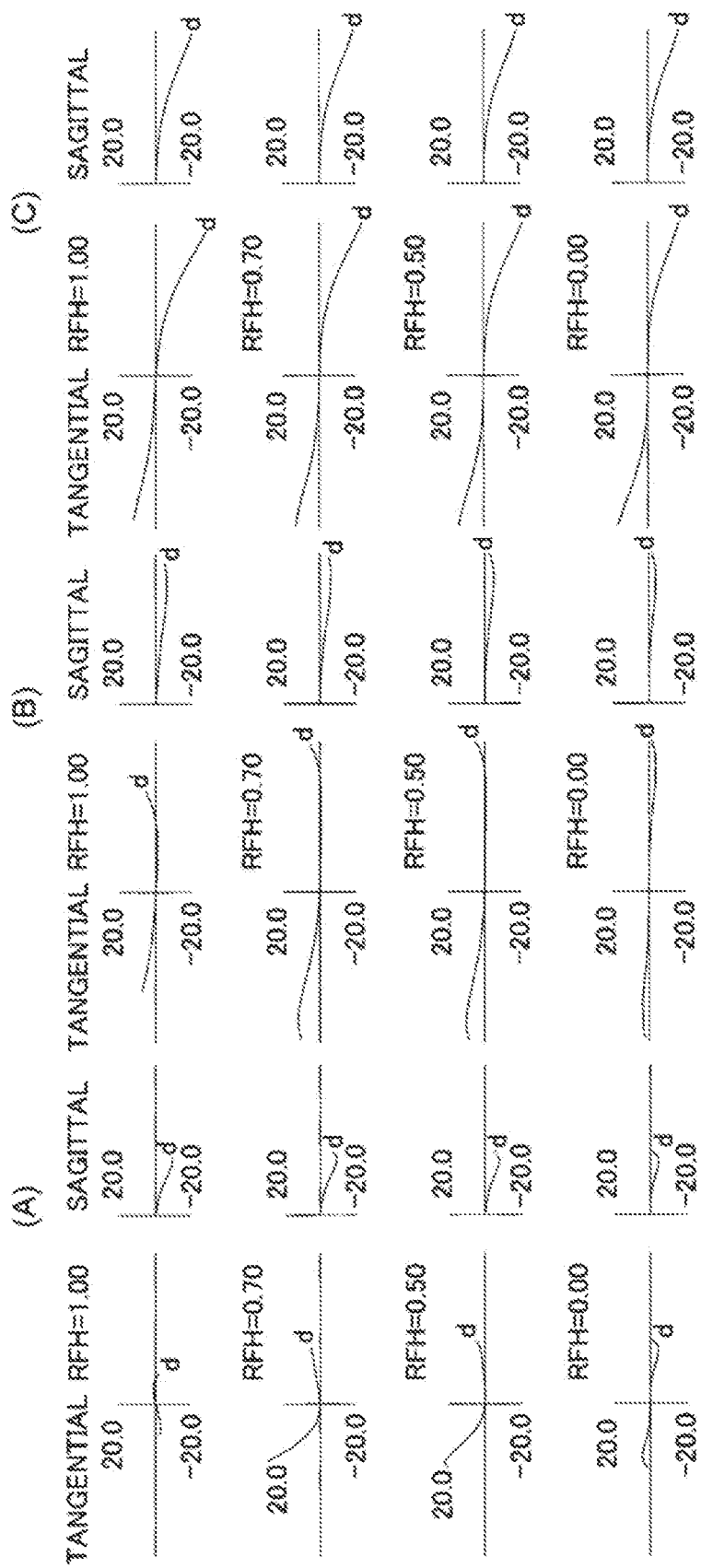
FIGS. 12(A), 12(B), and 12(C) show lateral aberration diagrams when the magnification of the telescope is 1 time, 5 times, and 10 times respectively in accordance with the third embodiment of the invention.

The third embodiment is described with reference to FIG. 10 to FIG. 12 and Table 3. FIG. 10 is a schematic diagram shows movement of lenses of a telescope TLS(3) when the magnification of the telescope TLS(3) is changed from 1 time, 5 times, to 10 times. In the third embodiment, the telescope TLS(3) includes an objective lens system OB, a relay lens system RL, and an eyepiece system EP, all of which are arranged in order from an object side. A first image plane IM1 is located between the objective lens system OB and the relay lens system RL. A second image plane IM2 is located between the relay lens system RL and the eyepiece system EP. The objective lens system OB collects the light emitted from an object and forms an inverted image of the object on the first image plane IM1. The inverted image formed by the objective lens system OB is again formed an upright image on the second image plane IM2 by the relay lens system RL.

The objective lens system OB includes a lens B1 with positive refractive power having a convex surface facing the object side and another convex surface facing the eye point side, a cemented lens of a lens B2 with positive refractive power having a convex surface facing the object side and another convex surface facing the eye point side and a lens B3 with negative refractive power having a concave surface facing the object side and another concave surface facing the eye point side, and a cemented lens of a lens B4 with positive refractive power having a convex surface facing the object side and another convex surface facing the eye point side and a lens B5 with negative refractive power having a concave surface facing the object side and another concave surface facing the eye point side, all of which are arranged in order from the object side.

The relay lens system RL includes a first lens group having positive refractive power, a second lens group G2 having positive refractive power, a third lens group G3 having positive refractive power, a fourth lens group G4 having negative refractive power, and a fifth lens group G5 having positive refractive power, all of which are arranged in order from the object side. By moving the second lens group G2 and the third lens group G3 along an optical axis while fixing the first image plane IM1 and the second image plane IM2, the image magnification of the relay lens system RL can be changed. In addition, when the image magnification of the relay lens system RL is changed from low magnification to high magnification, the second lens group G2 and the third lens group G3 move toward the object side along the optical axis AZ respectively. In addition, when the image magnification of the relay lens system RL is changed, the first lens group G1, the fourth lens group G4, and the fifth lens group G5 are fixed on the optical axis AZ.

The first lens group G1 is composed of a lens L11 with positive refractive power having a concave surface facing the object side and a convex surface facing the eye point side. The second lens group G2 is composed of a cemented lens of a lens L21 with positive refractive power having a convex surface facing the object side and another convex surface facing the eye point side and a lens L22 with negative refractive power having a concave surface facing the object side and a convex surface facing the eye point side. The third lens group G3 is composed of a cemented lens of a lens L31 with negative refractive power having a convex surface facing the object side and a concave surface facing the eye point side and a lens L32 with positive refractive power having a convex surface facing the object side and another convex surface facing the eye point side. The fourth lens group G4 is composed of a cemented lens of a lens L41 with negative refractive power having a concave surface facing the object side and another concave surface facing the eye point side and a lens L42 with positive refractive power having a convex surface facing the object side and a concave surface facing the eye point side. The fifth lens group G5 is composed of a lens L51 with positive refractive power having a convex surface facing the object side and a concave surface facing the eye point side.

The eyepiece system EP is composed of a lens E1 with negative refractive power having a concave surface facing the object side and another concave surface facing the eye point side, a cemented lens of a lens E2 with negative refractive power having a concave surface facing the object side and another concave surface facing the eye point side and a lens E3 with positive refractive power having a convex surface facing the object side and another convex surface facing the eye point side, and a lens E4 with positive refractive power having a convex surface facing the object side and another convex surface facing the eye point side, all of which are arranged in order from the object side.

Table 3 below shows the parameter values of the telescope of the third embodiment.

TABLE 3

| [All Parameters] | | |
|---|---|---|
| fo = 50.8 | fe = 50.8 | Φ5 = 20 |
| Φ23 = 14.5 | dG2 = 52.04 | L = 130.1 |
| de = 10.00 | f1 = 55.8 | f2 = 32.6 |
| f3 = 38.1 | f4 = −19.8 | f5 = 54.2 |
| f14 = 4.1 | | |

| [Lens Data] | | | | | | |
|---|---|---|---|---|---|---|
| Surface Number | R | D | nd | vd | Effective Diameter | Outer Diameter |
| 1 | 65.250 | 5.03 | 1.51633 | 64.14 | 28 | 29 |
| 2 | −307.560 | 0.47 | | | 28 | 29 |
| 3 | 39.000 | 6.36 | 1.49700 | 81.55 | 28 | 29 |
| 4 | −125.000 | 3.13 | 1.64769 | 33.79 | 28 | 29 |
| 5 | 76.840 | 31.92 | | | 28 | 29 |
| 7 | 23.420 | 6.84 | 1.49700 | 81.55 | 20 | 21 |
| 8 | −36.460 | 3.80 | 1.62041 | 60.29 | 20 | 21 |
| 9 | 100.880 | 12.44 | | | 20 | 21 |
| 10 | ∞ | 9.30 | | | 20 | 21(The First Image Plane) |
| 11 | −21.300 | 3.70 | 1.75520 | 27.58 | 21 | 22 |
| 12 | −15.210 | D1(Variable) | | | 21 | 22 |
| 13 | 146.080 | 5.00 | 1.60311 | 60.60 | 13.5 | 14.5 |
| 14 | −9.220 | 3.00 | 1.75520 | 27.58 | 13.5 | 14.5 |
| 15 | −17.770 | D2(Variable) | | | 13.5 | 14.5 |
| 16 | 31.210 | 3.00 | 1.75520 | 27.58 | 13.5 | 14.5 |
| 17 | 12.170 | 5.00 | 1.60311 | 60.60 | 13.5 | 14.5 |
| 18 | −39.620 | D3(Variable) | | | 13.5 | 14.5 |
| 19 | −26.350 | 2.00 | 1.48749 | 70.41 | 13.5 | 14.5 |
| 20 | 8.940 | 5.50 | 1.75520 | 27.58 | 13.5 | 14.5 |
| 21 | 11.900 | 24.31 | | | 13.5 | 14.5 |
| 22 | 29.420 | 4.00 | 1.74400 | 44.80 | 19 | 20 |
| 23 | 102.740 | 10.00 | | | 19 | 20 |
| 24 | ∞ | 10.00 | | | 19 | 20(The Second Image Plane) |
| 25 | −150.000 | 2.00 | 1.51680 | 64.13 | 21 | 22 |
| 26 | 35.960 | 20.34 | | | 21 | 22 |
| 27 | −112.700 | 2.00 | 1.74077 | 27.74 | 38 | 39 |
| 28 | 52.880 | 10.00 | 1.51680 | 64.13 | 38 | 39 |
| 29 | −36.940 | 0.30 | | | 38 | 39 |
| 30 | 64.470 | 9.00 | 1.60311 | 60.69 | 38.1 | 39 |
| 31 | −65.020 | | | | 38 | 39 |

TABLE 3-continued

[Variable Data]

| Image Magnification | D1 | D2 | D3 |
|---|---|---|---|
| 1 | 53.04 | 1.00 | 1.50 |
| 5 | 4.90 | 22.53 | 28.12 |
| 10 | 1.00 | 1.00 | 53.54 |

[Zoom Data]

| | Minimum Magnification | Maximum Magnification |
|---|---|---|
| Magnification | 1.0 | 10.0 |
| Half Field of View(degree) | 10.0 | 1.01 |
| fr | 80.0 | 13.3 |

[Condition Value]

| | |
|---|---|
| Condition (1) | $(-f4)/f5 = 0.37$ |
| Condition (2) | $\Phi 23/\Phi 5 = 0.73$ |
| Condition (3) | $dG2/L = 0.40$ |
| Condition (4) | $de/fe = 0.20$ |
| Condition (5) | $f2/f3 = 0.86$ |
| Condition (6) | $f14/(-f4) = 0.21$ |

FIG. 11(A), FIG. 11(B), and FIG. 11(C) are aberration diagrams when the magnification of the telescope of the third embodiment is 1 time, 5 times, and 10 times respectively. FIG. 12(A), FIG. 12(B), and FIG. 12(C) are the lateral aberration diagrams when the magnification of the telescope of the third embodiment is 1 time, 5 times, and 10 times respectively. It can be seen from the various aberration diagrams that the various aberration of the telescope of the third embodiment can be well corrected and has excellent image performance from low magnification state to high magnification state.

The Fourth Embodiment

Figure 13:
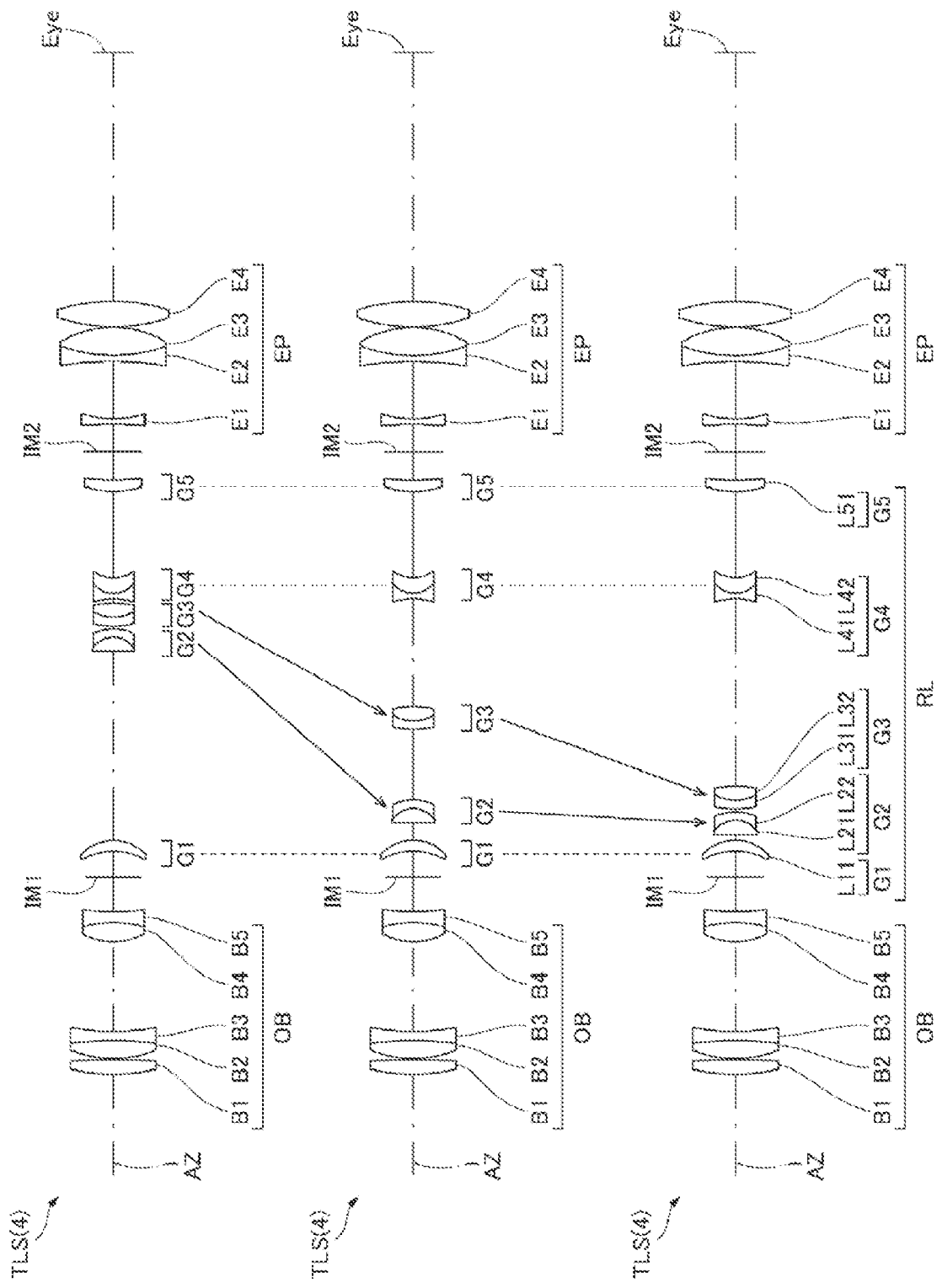
FIG. 13 is a schematic diagram shows movement of lenses of a telescope from the lowest magnification to the highest magnification in accordance with a fourth embodiment of the invention.
Figure 14:
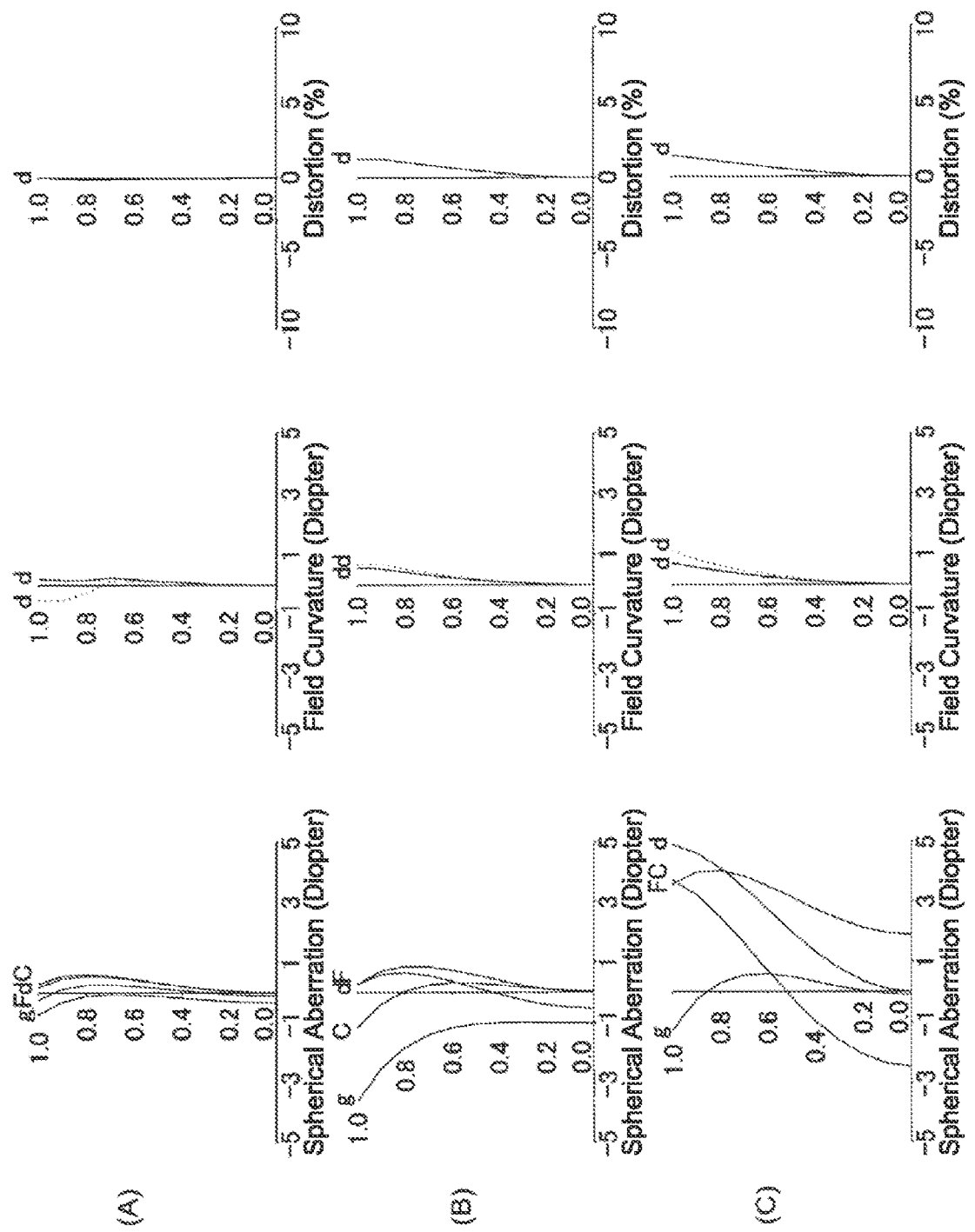
FIGS. 14(A), 14(B), and 14(C) show various aberration diagrams when the magnification of the telescope is 1 time, 6 times, and 12 times respectively in accordance with the fourth embodiment of the invention.
Figure 15:
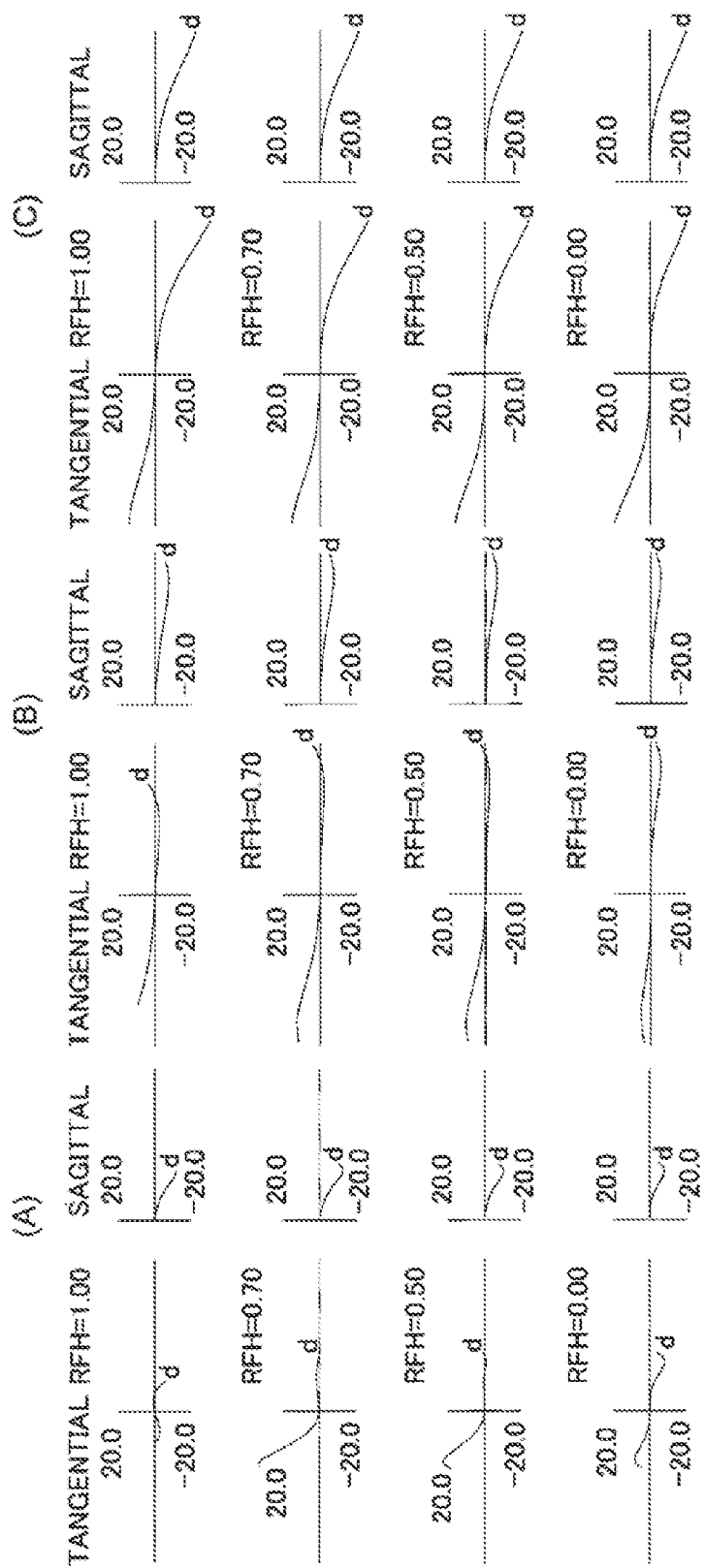
FIGS. 15(A), 15(B), and 15(C) show lateral aberration diagrams when the magnification of the telescope is 1 time, 6 times, and 12 times respectively in accordance with the fourth embodiment of the invention.

The fourth embodiment is described with reference to FIG. 13 to FIG. 15 and Table 4. FIG. 13 is a schematic diagram shows movement of lenses of a telescope TLS(4) when the magnification of the telescope TLS(4) is changed from 1 time, 6 times, to 12 times. In the fourth embodiment, the telescope TLS(4) includes an objective lens system OB, a relay lens system RL, and an eyepiece system EP, all of which are arranged in order from an object side. A first image plane IM1 is located between the objective lens system OB and the relay lens system RL. A second image plane IM2 is located between the relay lens system RL and the eyepiece system EP. The objective lens system OB collects the light emitted from an object and forms an inverted image of the object on the first image plane IM1. The inverted image formed by the objective lens system OB is again formed an upright image on the second image plane IM2 by the relay lens system RL.

The objective lens system OB includes a lens B1 with positive refractive power having a convex surface facing the object side and another convex surface facing the eye point side, a cemented lens of a lens B2 with positive refractive power having a convex surface facing the object side and another convex surface facing the eye point side and a lens B3 with negative refractive power having a concave surface facing the object side and another concave surface facing the eye point side, and a cemented lens of a lens B4 with positive refractive power having a convex surface facing the object side and another convex surface facing the eye point side and a lens B5 with negative refractive power having a concave surface facing the object side and another concave surface facing the eye point side, all of which are arranged in order from the object side.

The relay lens system RL includes a first lens group having positive refractive power, a second lens group G2 having positive refractive power, a third lens group G3 having positive refractive power, a fourth lens group G4 having negative refractive power, and a fifth lens group G5 having positive refractive power, all of which are arranged in order from the object side. By moving the second lens group G2 and the third lens group G3 along an optical axis while fixing the first image plane IM1 and the second image plane IM2, the image magnification of the relay lens system RL can be changed. In addition, when the image magnification of the relay lens system RL is changed from low magnification to high magnification, the second lens group G2 and the third lens group G3 move toward the object side along the optical axis AZ respectively. In addition, when the image magnification of the relay lens system RL is changed, the first lens group G1, the fourth lens group G4, and the fifth lens group G5 are fixed on the optical axis AZ.

The first lens group G1 is composed of a lens L11 with positive refractive power having a concave surface facing the object side and a convex surface facing the eye point side. The second lens group G2 is composed of a cemented lens of a lens L21 with positive refractive power having a convex surface facing the object side and another convex surface facing the eye point side and a lens L22 with negative refractive power having a concave surface facing the object side and a convex surface facing the eye point side. The third lens group G3 is composed of a cemented lens of a lens L31 with negative refractive power having a convex surface facing the object side and a concave surface facing the eye point side and a lens L32 with positive refractive power having a convex surface facing the object side and another convex surface facing the eye point side. The fourth lens group G4 is composed of a cemented lens of a lens L41 with negative refractive power having a concave surface facing the object side and another concave surface facing the eye point side and a lens L42 with positive refractive power having a convex surface facing the object side and a concave surface facing the eye point side. The fifth lens group G5 is composed of a lens L51 with positive refractive power having a convex surface facing the object side and a concave surface facing the eye point side.

The eyepiece system EP is composed of a lens E1 with negative refractive power having a concave surface facing the object side and another concave surface facing the eye point side, a cemented lens of a lens E2 with negative refractive power having a concave surface facing the object side and another concave surface facing the eye point side and a lens E3 with positive refractive power having a convex surface facing the object side and another convex surface facing the eye point side, and a lens E4 with positive refractive power having a convex surface facing the object side and another convex surface facing the eye point side, all of which are arranged in order from the object side.

Table 4 below shows the parameter values of the telescope of the fourth embodiment.

TABLE 4

[All Parameters]

| | | |
|---|---|---|
| fo = 53.5 | fe = 50.8 | Φ5 = 20 |
| Φ23 = 14.5 | dG2 = 59.63 | L = 144.7 |
| de = 10.00 | f1 = 64.9 | f2 = 34.7 |
| f3 = 38.4 | f4 = −20.0 | f5 = 64.7 |
| f14 = 4.0 | | |

[Lens Data]

| Surface Number | R | D | nd | vd | Effective Diameter | Outer Diameter |
|---|---|---|---|---|---|---|
| 1 | 65.250 | 5.03 | 1.51633 | 64.14 | 28 | 29 |
| 2 | −307.560 | 0.47 | | | 28 | 29 |
| 3 | 39.000 | 6.36 | 1.49700 | 81.55 | 28 | 29 |
| 4 | −125.000 | 3.13 | 1.64769 | 33.79 | 28 | 29 |
| 5 | 76.840 | 31.92 | | | 28 | 29 |
| 6 | 23.420 | 6.84 | 1.49700 | 81.55 | 20 | 21 |
| 7 | −36.460 | 3.80 | 1.62041 | 60.29 | 20 | 21 |
| 8 | 100.880 | 12.44 | | | 20 | 21 |
| 10 | ∞ | 9.30 | | | 20 | 21(The First Image Plane) |
| 11 | −21.300 | 3.70 | 1.75520 | 27.58 | 21 | 22 |
| 12 | −15.960 | D1(Variable) | | | 21 | 22 |
| 13 | 10393.260 | 5.00 | 1.60311 | 60.60 | 13.5 | 14.5 |
| 14 | −8.960 | 3.00 | 1.75520 | 27.58 | 13.5 | 14.5 |
| 15 | −16.980 | D2(Variable) | | | 13.5 | 14.5 |
| 16 | 33.360 | 3.00 | 1.75520 | 27.58 | 13.5 | 14.5 |
| 17 | 13.230 | 5.00 | 1.60311 | 60.60 | 13.5 | 14.5 |
| 18 | −38.520 | D3(Variable) | | | 13.5 | 14.5 |
| 19 | −26.350 | 2.00 | 1.48749 | 70.41 | 13.5 | 14.5 |
| 20 | 8.940 | 5.50 | 1.75520 | 27.58 | 13.5 | 14.5 |
| 21 | 12.000 | 30.69 | | | 13.5 | 14.5 |
| 22 | 33.310 | 4.00 | 1.74400 | 44.80 | 19 | 20 |
| 23 | 102.740 | 10.00 | | | 19 | 20 |
| 24 | ∞ | 10.00 | | | 19 | 20(The Second Image Plane) |
| 25 | −150.000 | 2.00 | 1.51680 | 64.13 | 21 | 22 |
| 26 | 35.960 | 20.34 | | | 21 | 22 |
| 27 | −112.700 | 2.00 | 1.74077 | 27.74 | 38 | 39 |
| 28 | 52.880 | 10.00 | 1.51680 | 64.13 | 38 | 39 |
| 29 | −36.940 | 0.30 | | | 38 | 39 |
| 30 | 64.470 | 9.00 | 1.60311 | 60.69 | 38.1 | 39 |
| 31 | −65.020 | | | | 38 | 39 |

[Variable Data]

| Image Magnification | D1 | D2 | D3 |
|---|---|---|---|
| 1 | 61.01 | 1.00 | 1.50 |
| 6 | 3.62 | 25.19 | 34.70 |
| 12 | 1.39 | 1.00 | 61.13 |

TABLE 4-continued

[Zoom Data]

| | Minimum Magnification | Maximum Magnification |
|---|---|---|
| Magnification | 1.0 | 12.0 |
| Half Field of View(degree) | 10.5 | 0.88 |
| fr | 76.9 | 12.0 |

[Condition Value]

| Condition (1) | $(-f4)/f5 = 0.31$ |
| Condition (2) | $\Phi 23/\Phi 5 = 0.73$ |
| Condition (3) | $dG2/L = 0.41$ |
| Condition (4) | $de/fe = 0.20$ |
| Condition (5) | $f2/f3 = 0.90$ |
| Condition (6) | $f14/(-f4) = 0.20$ |

FIG. 14(A), FIG. 14(B), and FIG. 14(C) are aberration diagrams when the magnification of the telescope of the fourth embodiment is 1 time, 6 times, and 12 times respectively. FIG. 15(A), FIG. 15(B), and FIG. 15(C) are the lateral aberration diagrams when the magnification of the telescope of the fourth embodiment is 1 time, 6 times, and 12 times respectively. It can be seen from the various aberration diagrams that the various aberration of the telescope of the fourth embodiment can be well corrected and has excellent image performance from low magnification state to high magnification state.

As described above, according to the embodiments, as long as the relay lens system RL maintains short total length, the telescope TLS with large magnification range can be achieved and aberration can be corrected well.

Here, each of the above mentioned embodiments is a specific example showing this embodiment, and this embodiment is not limited thereto.

DESCRIPTIONS OF SYMBOL

TLS telescope
OB objective lens system
RL relay lens system
G2 second lens group
G4 fourth lens group
EP eyepiece system
IM1 first image plane G1 first lens group
G3 third lens group
G5 fifth lens group IM2 second image plane

What is claimed is:

1. A telescope comprising:
an objective lens system;
a relay lens system; and
an eyepiece system;
wherein the objective lens system, the relay lens system, and the eyepiece system are arranged in order from an object side;
wherein the relay lens system comprises a first lens group having positive refractive power, a second lens group having positive refractive power, a third lens group having positive refractive power, a fourth lens group having negative refractive power, and a fifth lens group having positive refractive power, all of which are arranged in order from the object side, wherein an image is formed by the objective lens system;
wherein the second lens group and the third lens group move along an optical axis to change the image magnification of the relay lens system.

2. The telescope as claimed in claim 1, wherein the image is reimaged on an image plane which is between the relay lens system and the eyepiece system and the magnification of the telescope can be changed by change the image magnification of the relay lens system.

3. The telescope as claimed in claim 2, wherein the telescope satisfies the following condition:

$$0.1<(-f4)/f5<1.0;$$

wherein f4 is an effective focal length of the fourth lens group and f5 is an effective focal length of the fifth lens group.

4. The telescope as claimed in claim 3, wherein the telescope satisfies at least one of the following conditions:

$$0.5<\phi 23/\phi 5<1.0;$$

$$0.2<dG2/L<0.6;$$

$$0 \leq de/fe<0.7;$$

$$0.3<f2/f3<1.5;$$

$$0.1<f14/(-f4)<0.4;$$

wherein $\phi 5$ is a maximum outer diameter of the fifth lens group, $\phi 23$ is a maximum outer diameter among the second lens group and the third lens group, dG2 is a maximum amount of movement of the second lens group when the image magnification of the relay lens system changes from the lowest magnification to the highest magnification, L is a total length of the relay lens system, fe is an effective focal length of the eyepiece system, de is an interval from the image plane which is between the relay lens system and the eyepiece system to an object side surface of the negative lens of the eyepiece system, f2 is an effective focal length of the second lens group, f3 is an effective focal length of the third lens group, f14 is an effective focal length of a combination of the first lens group, the second lens group, the third lens group, and the fourth lens group when the image magnification of the relay lens system is maximum.

5. The telescope as claimed in claim 1, wherein the telescope satisfies the following condition:

$$0.5<\phi 23/\phi 5<1.0;$$

wherein $\phi 5$ is a maximum outer diameter of the fifth lens group and $\phi 23$ is a maximum outer diameter among the second lens group and the third lens group.

6. The telescope as claimed in claim 5, wherein the telescope satisfies the following condition:

$0.3 < f2/f3 < 1.5$;

wherein f2 is an effective focal length of the second lens group and f3 is an effective focal length of the third lens group.

7. The telescope as claimed in claim 1, wherein the telescope satisfies the following condition:

$0.2 < dG2/L < 0.6$;

wherein dG2 is a maximum amount of movement of the second lens group when the image magnification of the relay lens system changes from the lowest magnification to the highest magnification and L is a total length of the relay lens system.

8. The telescope as claimed in claim 1, wherein the eyepiece system comprises a negative lens which is closest to the object side and the telescope satisfies the following condition:

$0 \le de/fe < 0.7$;

wherein fe is an effective focal length of the eyepiece system and de is an interval from an image plane which is between the relay lens system and the eyepiece system to an object side surface of the negative lens of the eyepiece system.

9. The telescope as claimed in claim 1, wherein the telescope satisfies the following condition:

$0.3 < f2/f3 < 1.5$;

wherein f2 is an effective focal length of the second lens group and f3 is an effective focal length of the third lens group.

10. The telescope as claimed in claim 1, wherein the telescope satisfies the following condition:

$0.1 < f14/(-f4) < 0.4$;

wherein f4 is an effective focal length of the fourth lens group and f14 is an effective focal length of a combination of the first lens group, the second lens group, the third lens group, and the fourth lens group when the image magnification of the relay lens system is maximum.

11. A telescope series comprising:
a first telescope; and
a second telescope;
wherein the first telescope comprises a first objective lens system, a first relay lens system, and a first eyepiece system, all of which are arranged in order from an object side;
wherein the second telescope comprises a second objective lens system, a second relay lens system, and a second eyepiece system, all of which are arranged in order from the object side;
wherein the first relay lens system comprises a first lens group having positive refractive power, a second lens group having positive refractive power, a third lens group having positive refractive power, a fourth lens group having negative refractive power, and a fifth lens group having positive refractive power, all of which are arranged in order from the object side, wherein an image is formed by the first objective lens system;
wherein the second lens group and the third lens group move along an optical axis to change the image magnification of the first relay lens system;
wherein the second relay lens system is composed of the same lens group as the first relay lens system and an image formed by the second objective lens system is reimaged on an image plane which is between the second relay lens system and the second eyepiece system;
wherein the magnification of the second telescope can be changed by moving the second lens group and the third lens group along the optical axis to change the image magnification of the second relay lens system.

12. The telescope series as claimed in claim 11, wherein an effective focal length of the first eyepiece system is the same as an effective focal length of the second eyepiece system and an effective focal length of the first objective lens system is different to an effective focal length of the second objective lens system.

13. The telescope series as claimed in claim 11, wherein an effective focal length of the first objective lens system is the same as an effective focal length of the second objective lens system and an effective focal length of the first eyepiece system is different to an effective focal length of the second eyepiece system.

14. The telescope series as claimed in claim 11, wherein an effective focal length of the first objective lens system is different to an effective focal length of the second objective lens system and an effective focal length of the first eyepiece system is different to an effective focal length of the second eyepiece system.

15. The telescope series as claimed in claim 11, wherein:
the first objective lens system of the first telescope can be replaced with the second objective lens system which does not has the same effective focal length as the first objective lens system and can be used as the first objective lens system; and
the second objective lens system of the second telescope can be replaced with the first objective lens system which does not has the same effective focal length as the second objective lens system and can be used as the second objective lens system.

16. The telescope series as claimed in claim 15, wherein:
the first eyepiece system of the first telescope can be replaced with the second eyepiece system which does not has the same effective focal length as the first eyepiece system and can be used as the first eyepiece system; and
the second eyepiece system of the second telescope can be replaced with the first eyepiece system which does not has the same effective focal length as the second eyepiece system and can be used as the second eyepiece system.

17. The telescope as claimed in claim 16, wherein the telescope satisfies at least one of the following conditions:

$0.1 < (-f4)/f5 < 1.0$;

$0.5 < \phi23/\phi5 < 1.0$;

$0.2 < dG2/L < 0.6$;

$0 \le de/fe < 0.7$;

$0.3 < f2/f3 < 1.5$;

$0.1 < f14/(-f4) < 0.4$;

wherein f5 is an effective focal length of the fifth lens group, $\phi 5$ is a maximum outer diameter of the fifth lens group, $\phi 23$ is a maximum outer diameter among the second lens group and the third lens group, dG2 is a maximum amount of movement of the second lens group when the image magnification of the relay lens system changes from the lowest magnification to the highest magnification, L is a total length of the relay lens system, fe is an effective focal length of the eyepiece system, de is an interval from an image plane which is between the relay lens system and the eyepiece system to an object side surface of the negative lens of the eyepiece system, f2 is an effective focal length of the second lens group, f3 is an effective focal length of the third lens group, and f14 is an effective focal length of a combination of the first lens group, the second lens group, the third lens group, and the fourth lens group when the image magnification of the relay lens system is maximum.

18. The telescope as claimed in claim 16, wherein the image is reimaged on an image plane which is between the relay lens system and the eyepiece system and the magnification of the telescope can be changed by change the image magnification of the relay lens system.

19. The telescope series as claimed in claim 11, wherein:
the first eyepiece system of the first telescope can be replaced with the second eyepiece system which does not has the same effective focal length as the first eyepiece system and can be used as the first eyepiece system; and
the second eyepiece system of the second telescope can be replaced with the first eyepiece system which does not has the same effective focal length as the second eyepiece system and can be used as the second eyepiece system.

* * * * *